(12) United States Patent
Rössle et al.

(10) Patent No.: US 10,787,562 B2
(45) Date of Patent: Sep. 29, 2020

(54) SILANE-MEDIATED ENHANCEMENT OF RUBBER STORAGE STABILITY

(71) Applicant: TRINSEO EUROPE GMBH, Horgen (CH)

(72) Inventors: Michael Rössle, Merseburg (DE); Sven Thiele, Halle (DE); Helgard Ebert, Halle (DE)

(73) Assignee: TRINSEO EUROPE GMBH, Horgen (CH)

( * ) Notice: Subject to any disclaimer, the term of this patent is extended or adjusted under 35 U.S.C. 154(b) by 26 days.

(21) Appl. No.: 16/309,200

(22) PCT Filed: Jun. 16, 2017

(86) PCT No.: PCT/EP2017/064775
§ 371 (c)(1),
(2) Date: Dec. 12, 2018

(87) PCT Pub. No.: WO2017/216344
PCT Pub. Date: Dec. 21, 2017

(65) Prior Publication Data
US 2019/0169406 A1    Jun. 6, 2019

(30) Foreign Application Priority Data
Jun. 17, 2016 (EP) .................... 16175039

(51) Int. Cl.
| C08L 9/06 | (2006.01) |
| C08L 53/02 | (2006.01) |
| B60C 1/00 | (2006.01) |
| C08C 19/22 | (2006.01) |
| C08F 236/10 | (2006.01) |
| C08C 19/44 | (2006.01) |
| C08F 236/04 | (2006.01) |
| C08C 19/42 | (2006.01) |
| C08C 19/25 | (2006.01) |

(52) U.S. Cl.
CPC .............. *C08L 9/06* (2013.01); *B60C 1/00* (2013.01); *C08C 19/22* (2013.01); *C08C 19/25* (2013.01); *C08C 19/42* (2013.01); *C08C 19/44* (2013.01); *C08F 236/04* (2013.01); *C08F 236/10* (2013.01); *C08F 2800/20* (2013.01)

(58) Field of Classification Search
None
See application file for complete search history.

(56) References Cited

U.S. PATENT DOCUMENTS

| 5,219,938 A * | 6/1993 | Imai ...................... B60C 1/0016 |
| | | 525/102 |
| 8,916,665 B2 * | 12/2014 | Lawson ................... C08F 4/48 |
| | | 526/178 |
| 2006/0241294 A1 | 10/2006 | Tonomura et al. |
| 2015/0099823 A1 | 4/2015 | Imoto et al. |
| 2016/0152756 A1 | 6/2016 | Lawson et al. |

FOREIGN PATENT DOCUMENTS

| EP | 0 493 364 | 7/1992 |
| EP | 3434697 A1 * | 1/2019 |
| WO | WO 2015/055252 | 4/2015 |

OTHER PUBLICATIONS

International Search Report dated Aug. 24, 2017 from PCT Priority Application No. PCT/EP2017/064775.
Written Opinion Aug. 24, 2017 from PCT Priority Application No. PCT/EP2017/064775.

* cited by examiner

*Primary Examiner* — Tae H Yoon
(74) *Attorney, Agent, or Firm* — Barnes & Thornburg LLP; G. Peter Nichols

(57) ABSTRACT

The present invention relates to a process for preparing a branched elastomeric polymer by polymerization of a conjugated diene in the presence of a specific branching agent and a specific stabilizing compound. The branched elastomeric polymer exhibits improved storage stability, as reflected by a constant, or less variable, polymer viscosity over time and with reduced temperature dependence.

18 Claims, 5 Drawing Sheets

SILANE-MEDIATED ENHANCEMENT OF RUBBER STORAGE STABILITY

This application is a U.S. nationalization under 35 U.S.C. § 371 of International Patent Application No. PCT/EP2017/064775, filed Jun. 16, 2017, which claims priority to EP Application No. 16175039.3, filed Jun. 17, 2016; the entire contents of each are incorporated herein by reference.

FIELD OF THE INVENTION

The present invention is directed to a process for preparing a branched elastomeric polymer by polymerization of a conjugated diene in the presence of a specific branching agent and a specific stabilizing compound. The resulting elastomeric polymer can favorably be used in rubber articles such as tires.

BACKGROUND OF THE INVENTION

Increasing oil prices and national legislation requiring the reduction of automotive carbon dioxide emissions force tire and rubber producers to produce "fuel-efficient" and thus fuel-saving tires. One approach for obtaining fuel-efficient tires lies in the production of tire formulations having reduced hysteresis loss. The hysteresis loss of a crosslinked elastomeric polymer composition is related to its tan δ value at 60° C. (see ISO 4664-1:2005; Rubber, Vulcanized or thermoplastic; Determination of dynamic properties part 1: General guidance). In general, vulcanized elastomeric polymer compositions having relatively low tan δ values at 60° C. are preferred as having lower hysteresis loss. In the final tire product, this translates into a lower rolling resistance and better fuel economy. In contrast, a lower tan δ value at 0° C. corresponds to a deteriorated wet grip of the tire product. Thus, a lower rolling resistance tire can be made at the expense of deteriorated wet grip properties. For example, if, in a random solution styrene-butadiene rubber (random SSBR), the polystyrene unit concentration is reduced with respect to the total polybutadiene unit concentration, the SSBR glass transition temperature is reduced and, as a result, both tan δ at 60° C. and tan δ at 0° C. are reduced, generally corresponding to improved rolling resistance and deteriorated wet grip performance of the tire. Accordingly, when assessing the rubber vulcanizate performance correctly, both tan δ at 60° C. and tan δ at 0° C. should be monitored along with the tire heat build-up.

WO 2012/091753 relates to silane-functionalized polymers and rubber vulcanizates prepared therefrom. The authors describe the use of certain alkenylaminosilanes for use in the initiation of anionic polymerizations.

U.S. Pat. No. 8,299,167 B2 relates to a conjugated diene polymer obtained by polymerizing a conjugated diene monomer and a vinylaminosilane in the presence of an alkali metal catalyst.

WO 2011/028523 relates to a process for preparing a polydiene, the process comprising the polymerization of a conjugated diene monomer with a lanthanide-based catalyst system in the presence of a vinylsilane, an allylsilane or an allylvinylsilane.

WO 2015/055252 describes vinylsilane compounds which are useful as modifying monomers in the polymerization of conjugated diene monomers, optionally together with aromatic vinyl monomers, thus producing polymers, specifically elastomeric polymers, which can be used for producing a tire.

Hydrolytically cleavable bonds within the polymer backbone can, when actually cleaved, lead to a reduction of polymer viscosity, owing to a reduction of the polymer molecular weight. In the case of coupled (branched) polymers, a reduction of the coupling rate (proportion of branched polymer chains vs. unbranched polymer chains) and Mooney viscosity can be observed as a function of time and temperature. Polymers exhibiting such unstable storage behavior are inferior from a commercial point of view. It is an object of the present invention to provide a branched elastomeric polymer which exhibits an improved storage stability, as reflected by a constant, or less variable, polymer viscosity over time and with reduced temperature dependence.

SUMMARY OF THE INVENTION

The present invention is inter alia based on the understanding that hydrolytically cleavable bonds within the polymer backbone include polymer-$Si(R_2)$—O-polymer, polymer-$Si(R_2)$—N(R)-polymer, and polymer-$Si(R_2)$—S-polymer bonds. In the presence of nucleophiles such as water, alcohol etc., the bonds may be cleaved as follows:

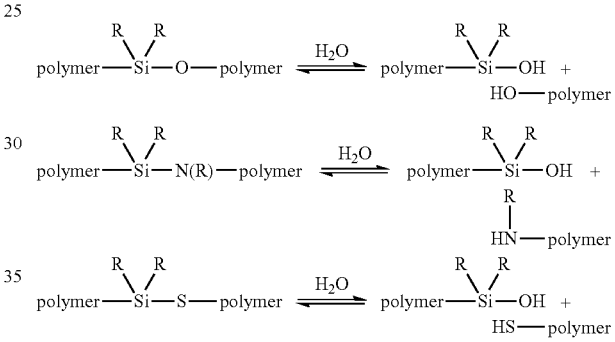

To prevent such a hydrolytic cleavage, water scavengers can be added to the polymer formulation. One commercial example is Stabaxol® from Rheinchemie as a carbodiimide-based water scavenger. These externally added water scavengers can reduce the reaction rate of a hydrolytical cleavage due to a consumption of present water molecules on the surface. However, these compounds are consumed and deactivated by nucleophiles. After complete consumption, they are inactive and cannot prevent hydrolytic cleavage of the polymer anymore. In accordance with the invention, it has been found that the above objects can be solved by employing in combination a specific multi(vinyl or butadienyl) aminosilane compound as a branching (coupling) agent and a specific vinylsilane compound as a stabilizing compound when preparing an elastomeric polymer by polymerization of one or more conjugated dienes such as 1,3-butadiene ("butadiene") and isoprene and optionally one or more aromatic vinyl compounds such as styrene.

In a first aspect, the present invention provides a process for preparing a branched elastomeric polymer, said process comprising:

(a) polymerizing at least one conjugated diene and a compound of Formula 1 as defined below, and optionally one or more aromatic vinyl monomers, in the presence of an initiator compound, (a') polymerizing at least one conjugated diene and optionally one or more aromatic vinyl monomers in the presence of an initiator compound obtainable by reacting a compound of Formula 1 as defined below with an organo-alkali metal compound, or (a") reacting a living polymer, obtainable by anionically polymerizing at least one conjugated diene and optionally one or more aromatic vinyl monomers, with a compound of Formula 1 as defined below, characterized in that (a), (a') and (a") is carried out in the presence of a stabilizer compound of Formula 2 as defined below;

(A)–Bn    (Formula 1)

each B is independently selected from a group —Si($R^1$)($R^2$)($R^3$), wherein $R^1$, $R^2$ and $R^3$ are each independently selected from vinyl, butadienyl, methyl, ethyl, propyl, butyl, hexyl, octyl, phenyl and benzyl, with the proviso that at least one of $R^1$, $R^2$ and $R^3$ is selected from vinyl and butadienyl, wherein each group B is a substituent of an amino group of group A;

at least two of the amino groups of group A are each substituted with at least one group B;

n is an integer of at least 2, preferably an integer selected from 2 to 6; and all amino groups in group A are tertiary amino groups;

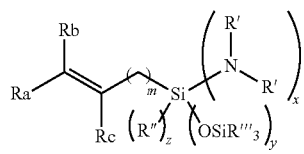
(Formula 2)

wherein

R' is independently selected from $C_1$-$C_{12}$ alkyl, $C_2$-$C_{12}$ alkenyl, $C_6$-$C_{18}$ aryl and $C_7$-$C_{18}$ alkylaryl, wherein the two R' groups may be connected to form a ring and the ring may contain, further to the Si-bonded nitrogen atom, one or more of an oxygen atom, a nitrogen atom, an >N($C_1$-$C_6$ alkyl, $C_6$-$C_{18}$ aryl, $C_7$-$C_{18}$ alkylaryl) group and a sulfur atom;

R" is selected from $C_1$-$C_6$ hydrocarbyl;

R''' is independently selected from $C_1$-$C_{18}$ hydrocarbyl;

$R_a$, $R_b$ and $R_c$ are independently selected from hydrogen, methyl, ethyl and vinyl;

x is an integer selected from 1 and 2; y is an integer selected from 0, 1 and 2; z is an integer selected from 0, 1 and 2; and x+y+z=3;

m is selected from 0 and 1; with the proviso that, when none of $R_a$, $R_b$ and $R_c$ is vinyl, then m=0.

In a second aspect, the present invention provides a branched elastomeric polymer obtainable by the process according to the first aspect of the invention.

In a third aspect, the present invention provides a non-vulcanized (non-cured) polymer composition comprising the branched elastomeric polymer according to the second aspect of the invention and one or more further components selected from (i) components which are added to or formed as a result of the polymerization process used for making said polymer, (ii) components which remain after solvent removal from the polymerization process, and (iii) components which are added to the polymer after completion of the polymer manufacturing process, thus including components which are added to the "solvent-free" polymer by application of (but not limited to) a mechanical mixer.

In a fourth aspect, the present invention provides a vulcanized (cured) polymer composition which is obtained by vulcanizing (curing) the non-cured polymer composition according to the third aspect of the invention which comprises one or more vulcanizing (curing) agents.

In a fifth aspect, the present invention provides a process for preparing a vulcanized polymer composition, said process comprising vulcanizing the non-vulcanized polymer composition according to the third aspect of the invention which comprises one or more vulcanizing agents.

In a sixth aspect, the present invention provides an article comprising at least one component formed from the vulcanized polymer composition according to the fourth aspect of the invention.

Surprisingly, it has been found that the addition of a vinyl, butadienyl or isoprenyl aminosilane, i.e. a compound of Formula 2, during polymerization can stabilize the polymer viscosity of a branched polymer having hydrolytically cleavable bonds, i.e. a polymer branched by means of a compound of Formula 1.

DETAILED DESCRIPTION

Compound of Formula 1

Figure 1:
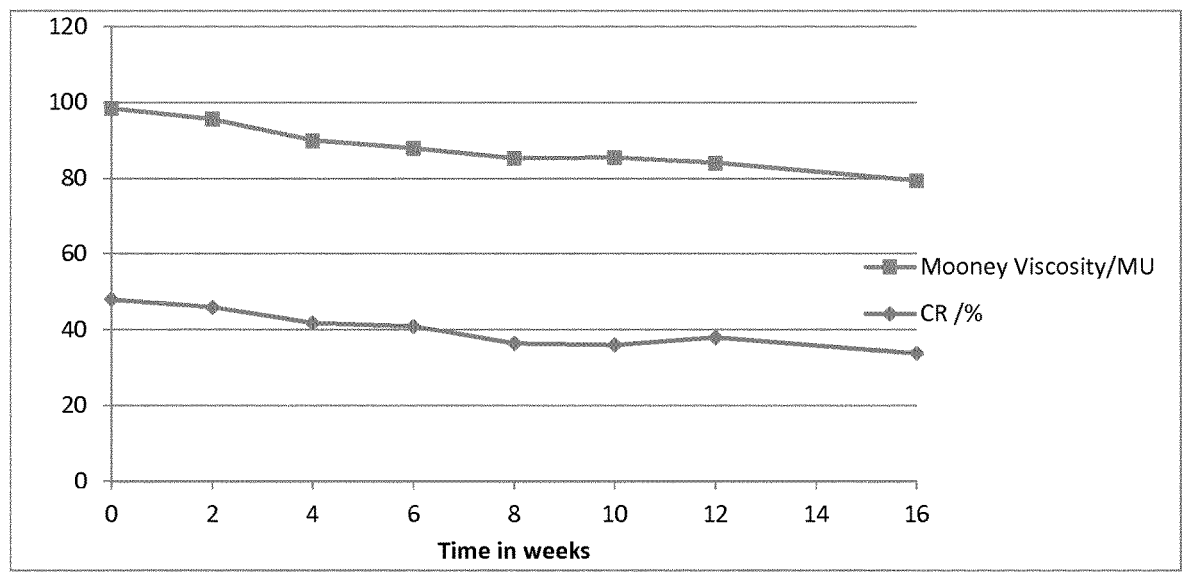
FIG. 1 is a diagram showing the development of the Mooney viscosity in Mooney Units (MU) and coupling rate (CR) of end-modified, branched and unstabilized polymer according to Comparative Example Ex1 over time at 25° C.
Figure 2:
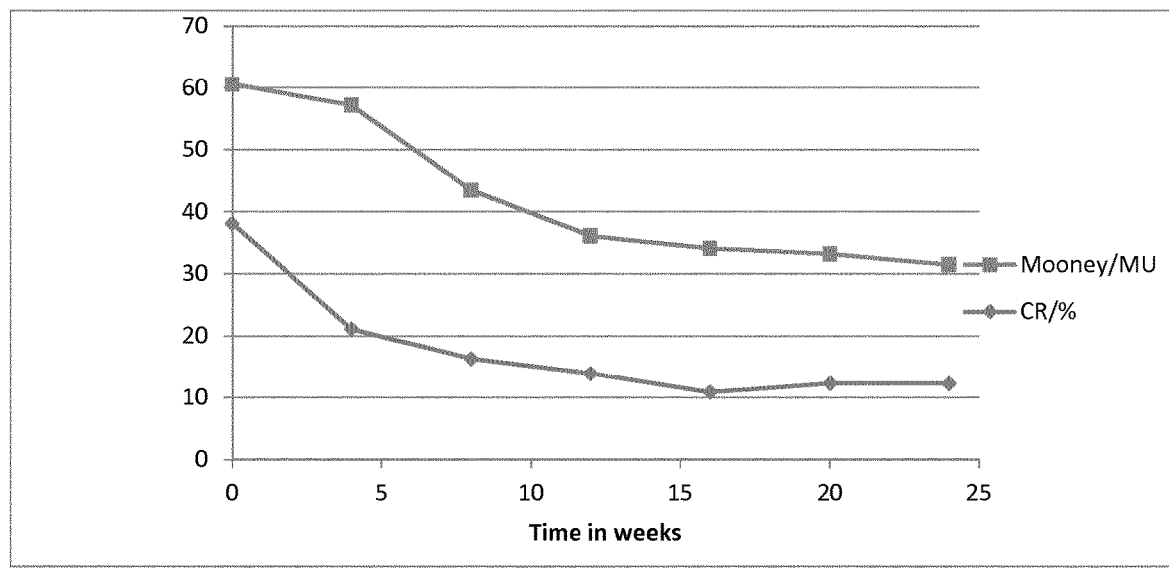
FIG. 2 is a diagram showing the development of the Mooney viscosity in MU and coupling rate (CR) of end-modified, branched and unstabilized polymer according to Comparative Example Ex2 over time at 25° C.
Figure 3:
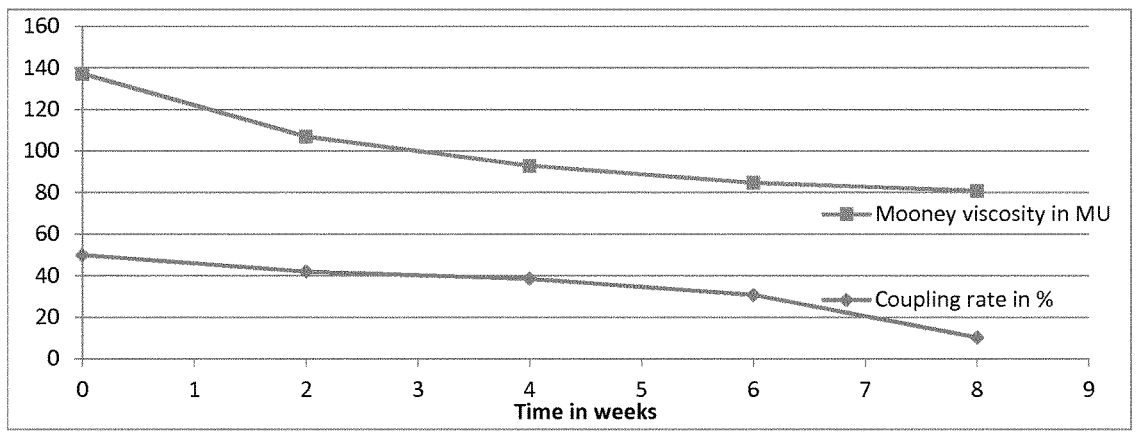
FIG. 3 is a diagram showing the development of the Mooney viscosity in MU and coupling rate (CR) of end-modified, branched and unstabilized polymer according to Comparative Example Ex3 over time at 25° C.
Figure 4:
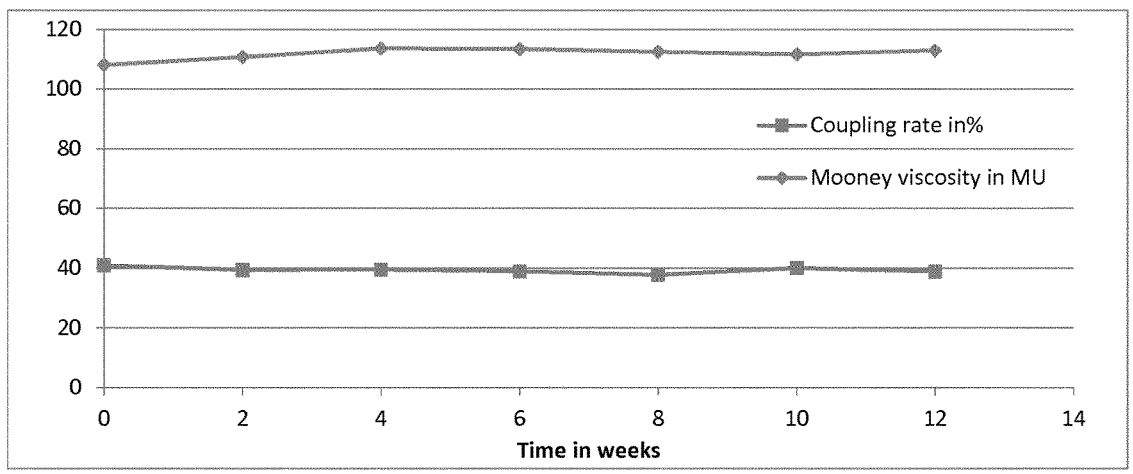
FIG. 4 is a diagram showing the development of the Mooney viscosity in MU and coupling rate (CR) of end-modified, branched and stabilized polymer according to Example Ex4 over time at 25° C.
Figure 5:
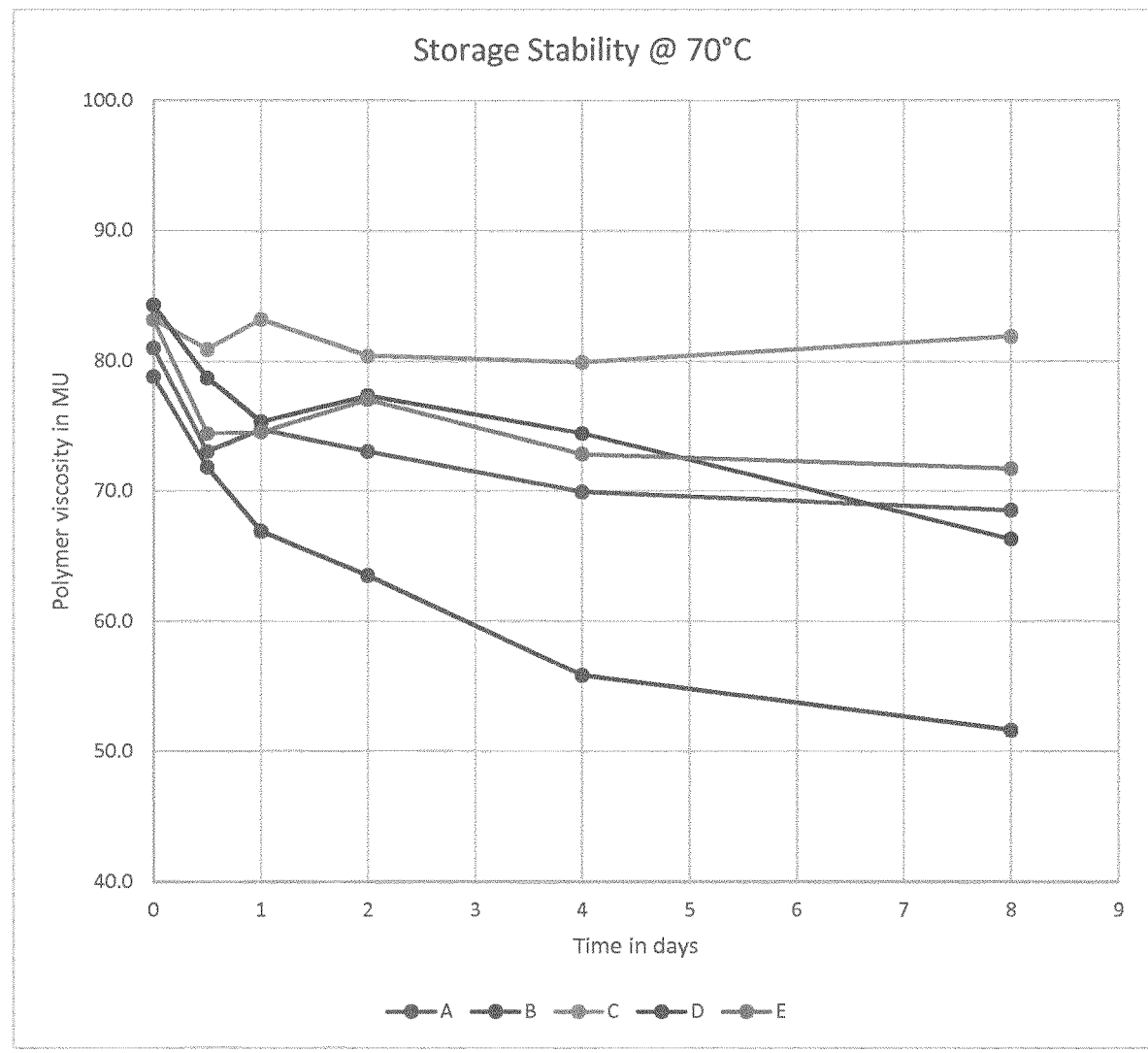
FIG. 5 is a diagram showing the development of the Mooney viscosity in MU of the following five polymers over time at 70° C. (accelerated test for storage stability): Unstabilized polymers: D (reduction 18 MU), E (reduction: 11.5 MU). Stabilized polymers: A (reduction: 12.5 MU), B (reduction: 27.2 MU), C (reduction 1.3 MU). Stabilizer for polymer B (S2) has no stabilizing effect. Stabilizer S3 for polymer A has medium effect (improved storage stability of 14.7 MU vs. polymer B), which may be compensated by higher dosing. Stabilizer S7 is highly effective at same dosing quantities.
Figure 6:
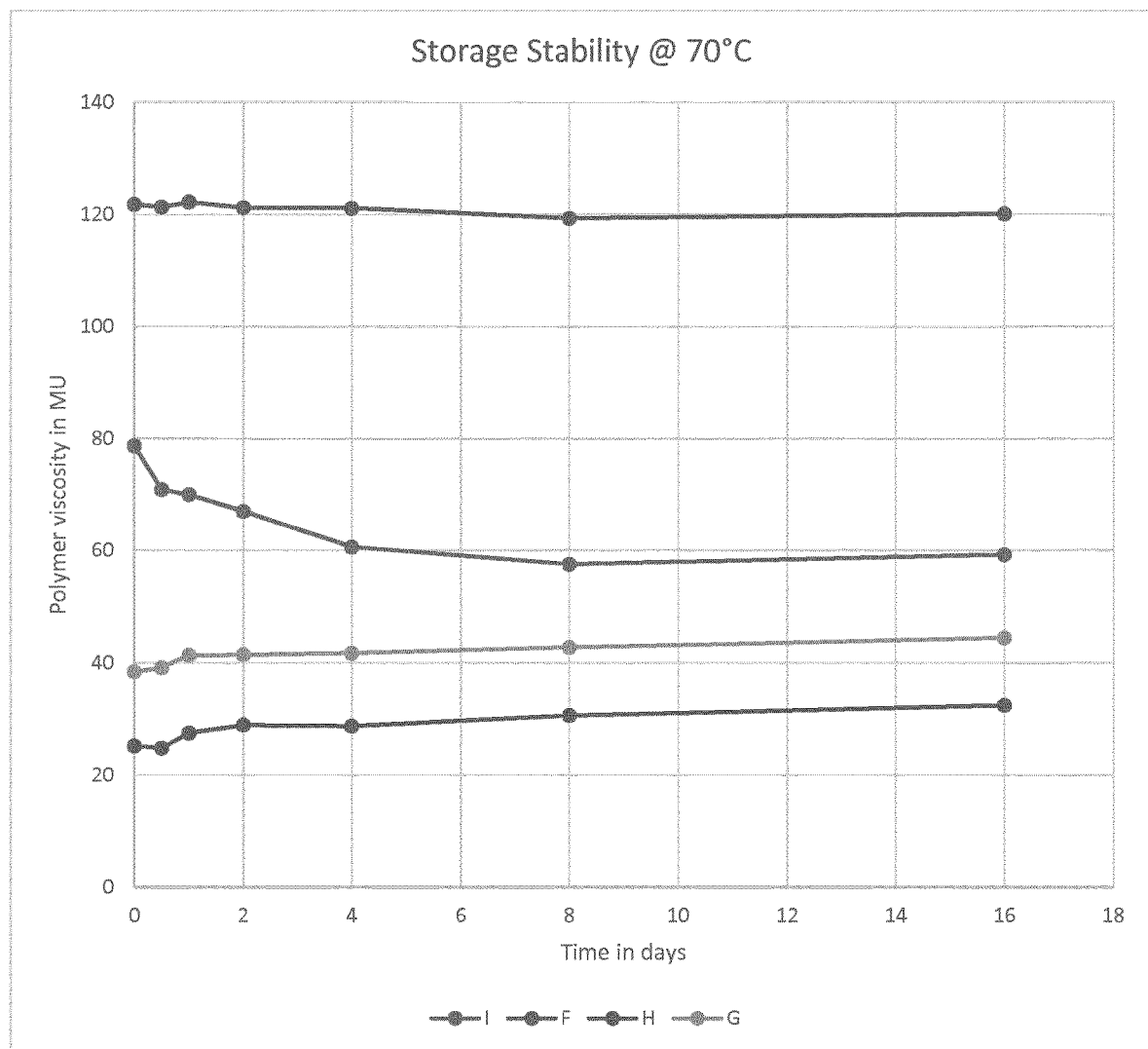
FIG. 6 is a diagram showing the development of the Mooney viscosity in MU of the following four polymers over time at 70° C. (accelerated test for storage stability): Unstabilized polymer: I (reduction 19.5 MU). Stabilized polymers: F (reduction: 1.7 MU), G (increase 6.0 MU, slight reduction of stabilizer S6 amount is possible), H (increase 7.2 MU, slight reduction of stabilizer S6 amount is possible).
Figure 7:
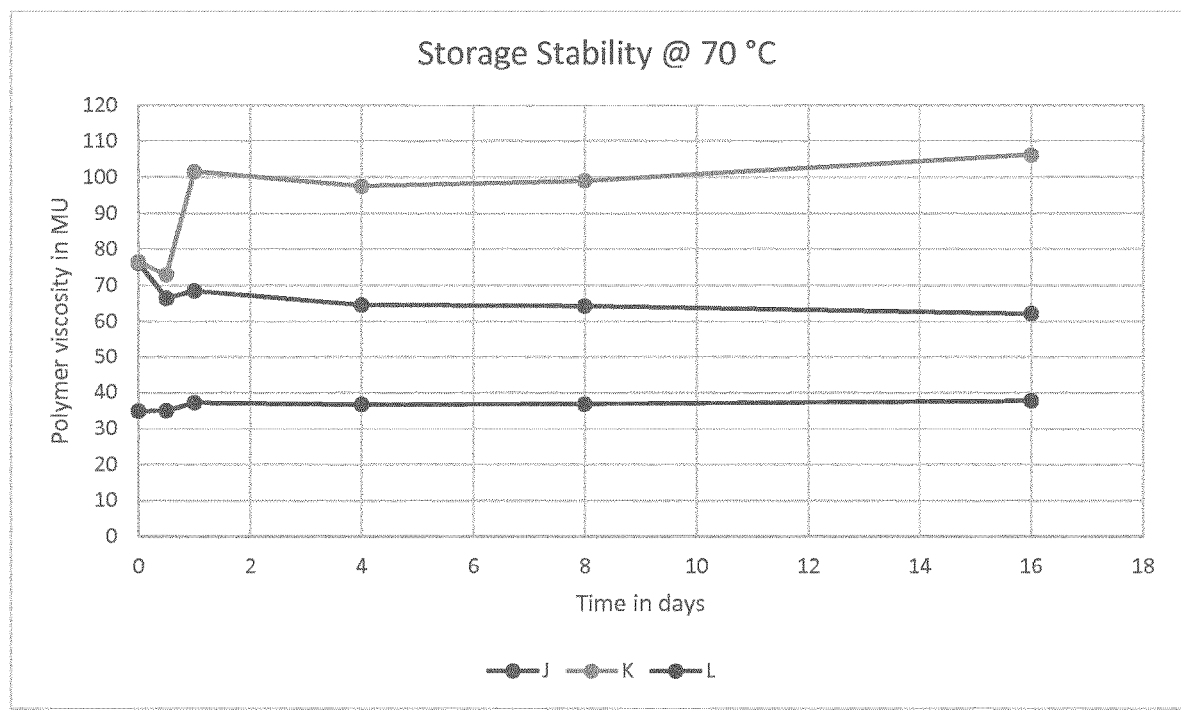
FIG. 7 is a diagram showing the development of the Mooney viscosity in MU of the following three polymers over time at 70° C. (accelerated test for storage stability): Stabilized polymers: J (reduction 14.4 MU, stabilizer S16, dosing 2 equiv./Initiator), K (increase 29.7 MU, stabilizer S16, dosing 5 equiv./Initiator), L (increase 2.8 MU, stabilizer S16, dosing 2 equiv./Initiator, lower Mp and lower CR as polymer example J). A comparison of the storage behavior of non-endmodified polymers J and K results in an optimal S16 dosing amount of about 3 eq./eq. initiator for these polymers. Polymer L differs in molecular weight, coupling rate and microstructure.

The compound of Formula 1 generally is a multi(vinyl or butadienyl)aminosilane, i.e. it has at least two amino groups substituted with at least one ethylenically unsaturated silyl group B (as defined for Formula 1). The expression "group B is a substituent of an amino group" or "amino group substituted with a group B" is used herein to describe the bonding of the group B to the nitrogen atom of the amino group, i.e. >N—Si($R^1$)($R^2$)($R^3$). An amino group of group A may be substituted with 0, 1 or 2 groups B. All amino groups of group A are tertiary amino groups, i.e. amino groups carrying no hydrogen atom.

The organic group A is preferably a group having no active hydrogens. The expression "active hydrogen" is used in the context of the present invention to designate a hydrogen atom which is not inert, i.e. will react, in an anionic polymerization of conjugated dienes such as butadiene or isoprene.

The organic group A is also preferably a group having no electrophilic groups. The expression "electrophilic group" is used in the context of the present invention to designate a group which will react with n-butyllithium as a model initiator and/or with the living chain in an anionic polymerization of conjugated dienes such as butadiene or isoprene. Electrophilic groups include: alkynes, (carbo)cations, halogen atoms, Si—O, Si—S, Si-halogen groups, metal-C-groups, nitriles, (thio)carboxylates, (thio)carboxylic esters, (thio)anhydrides, (thio)ketones, (thio)aldehydes, (thio)cyanates, (thio)isocyanates, alcohols, thiols, (thio)sulfates, sulfonates, sulfamates, sulfones, sulfoxides, imines, thioketals, thioacetals, oximes, carbazones, carbodiimides, ureas, urethanes, diazonium salts, carbamates, amides, nitrones, nitro groups, nitrosamines, xanthogenates, phosphanes, phosphates, phosphines, phosphonates, boronic acids, boronic esters, etc.

More preferably, the organic group A is a group having neither active hydrogens nor electrophilic groups.

In preferred embodiments of the first aspect of the invention, the compound of Formula 1 is selected from the following compounds of Formulas 1-1 to 1-5, in which the same limitations and provisos of Formula 1 apply as regards the group B and the index n, i.e. the compound has at least two groups B, while the limitations and provisos of Formula 1 for group A are inherently satisfied:

Embodiment 1

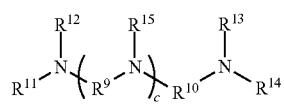

(Formula 1-1)

wherein
each of $R^{11}$, $R^{12}$, $R^{13}$, $R^{14}$ and $R^{15}$ is independently selected from group B, $C_1$-$C_{18}$ alkyl, $C_6$-$C_{18}$ aryl, optionally $C_1$-$C_4$ alkyl-substituted $C_3$-$C_{12}$ heteroaryl, $C_7$-$C_{18}$ aralkyl, $(R^4)_a$—O—$(R^5)_b$, wherein each of $R^4$ and $R^5$ is independently selected from $C_1$-$C_6$ alkyl and $C_6$-$C_{18}$ aryl and a and b are each integers independently selected from 0 to 4, and —Si($R^6$)($R^7$)($R^8$), wherein each of $R^6$, $R^7$ and $R^8$ is independently selected from methyl, ethyl, propyl, butyl, hexyl, octyl, phenyl and benzyl;
each of $R^9$ and $R^{10}$ is independently selected from divalent ethyl, propyl, butyl, phenyl and —$(CH_2)_{a'}$—$C_6H_5$—$(CH_2)_{b'}$—, wherein each of a' and b' is an integer independently selected from 0 and 1; and
c is an integer selected from 0, 1, 2 and 3.

Preferably in Formula 1-1, each of $R^{11}$, $R^{12}$, $R^{13}$, $R^{14}$ and $R^{15}$ is independently selected from group B and methyl; each of $R^9$ and $R^{10}$ is divalent ethyl; and c is an integer selected from 0, 1, 2 and 3.

Specific embodiments of Formula 1-1 include:

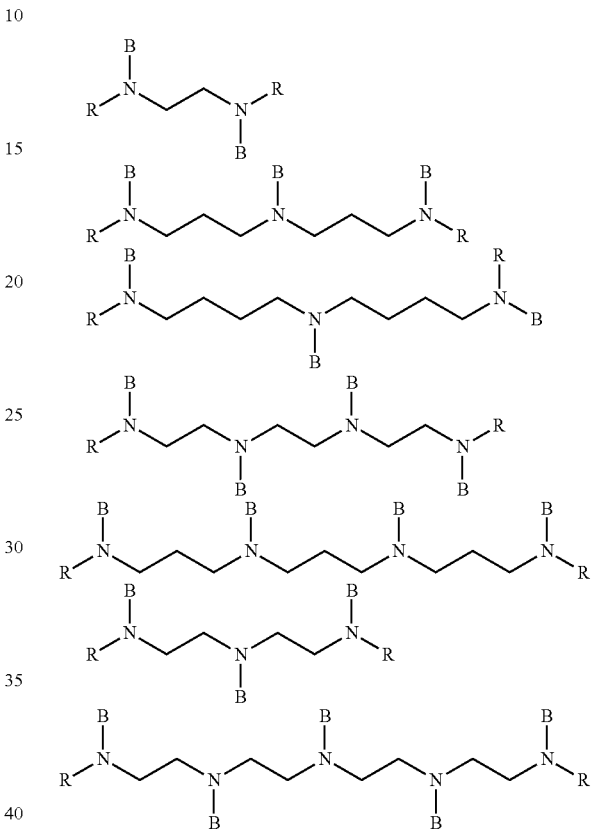

wherein each R is independently selected from B, $C_1$-$C_6$ alkyl and benzyl.

Embodiment 2

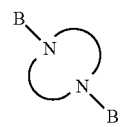

(Formula 1-2)

wherein the group —N< >N— is a 5- to 18-membered heterocyclic group which may be saturated or unsaturated and which may be substituted on any carbon atom of the ring with a $C_1$-$C_6$ alkyl group, wherein heteroatomic groups other than the two N atoms expressly shown in Formula 1-2 are selected from —N=, >$NR^{16}$, wherein $R^{16}$ is selected from group B, $C_1$-$C_6$ alkyl, phenyl and benzyl, —O—, —S— and >$SiR^{17}R^{18}$, wherein each of $R^{17}$ and $R^{18}$ is independently selected from $C_1$-$C_6$ alkyl, phenyl and benzyl. A preferred group —N< >N— is piperazinyl, methylpiperazinyl, dimethylpiperazinyl, tetramethylpiperazinyl.

Specific embodiments of Formula 1-2 include:

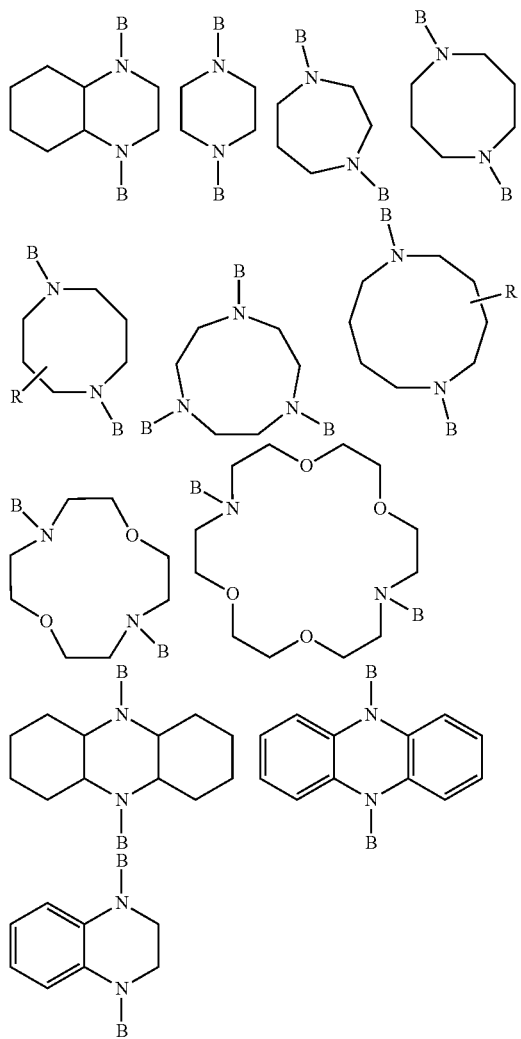

wherein R is a $C_1$-$C_6$ alkyl group.

Embodiment 3

(Formula 1-3)

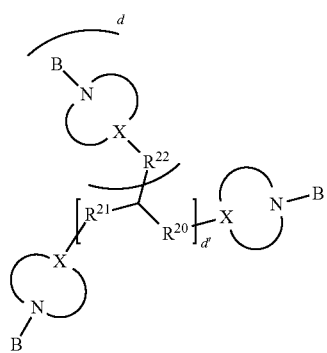

wherein each of $R^{20}$, $R^{21}$ and $R^{22}$ is independently selected from a single bond and a divalent $C_1$-$C_{10}$ alkyl group, d is an integer selected from 0, 1 and 2, d' is an integer selected from 0 and 1, wherein d is 0 when d' is 0, each group —N< >X— is independently selected from a 5- to 10-membered heterocyclic group which may be saturated or unsaturated and which may be substituted on any carbon atom of the ring with a $C_1$-$C_6$ alkyl group, wherein each X is independently selected from —N—, —C= and —CH—, and heteroatomic groups other than the two groups N and X expressly shown in Formula 1-3 are selected from —N=, >$NR^{16}$, wherein $R^{16}$ is selected from $C_1$-$C_6$ alkyl, group B, phenyl and benzyl, —O—, —S— and >$SiR^{17}R^{18}$, wherein each of $R^{17}$ and $R^{18}$ is independently selected from $C_1$-$C_6$ alkyl, phenyl and benzyl. Preferred groups —N< >X— include piperidinyl and piperazinyl.

Specific embodiments of Formula 1-3 include:

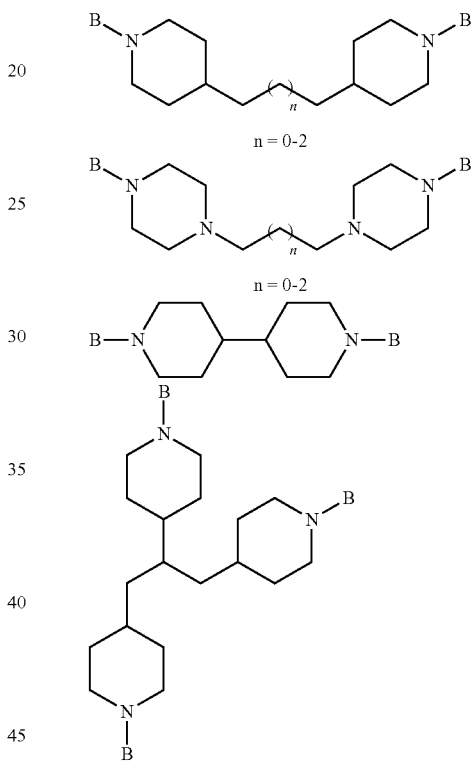

Embodiment 4

(Formula 1-4)

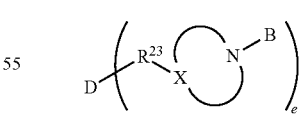

wherein D is a 5- to 10-membered carbocyclic or heterocyclic group which may be saturated or unsaturated and which may be substituted on any carbon atom of the ring with a $C_1$-$C_6$ alkyl group, wherein heteroatomic groups are selected from —N=, >$NR^{16}$, wherein $R^{16}$ is selected from $C_1$-$C_6$ alkyl, group B, phenyl and benzyl, —O—, —S— and >$SiR^{17}R^{18}$, wherein each of $R^{17}$ and $R^{18}$ is independently selected from $C_1$-$C_6$ alkyl and phenyl, each group —N< >X— is independently selected from a 5- to 10-mem bered heterocyclic group which may be saturated or unsaturated and which may be substituted on any carbon atom of the ring with a $C_1$-$C_6$ alkyl group, wherein each X is independently selected from —N—, —C= and —CH—, $R^{23}$ is selected from a single bond and a divalent $C_1$-$C_{10}$ alkyl group, and e is an integer selected from 2, 3 and 4. Preferred groups D include cyclopentyl, cyclohexyl, phenyl and tetrahydrofuranyl. Preferred groups —N< >X— include piperidinyl and piperazinyl.

Preferably in Formula 1-4, D is selected from cyclopentyl, cyclohexyl, phenyl and tetrahydrofuranyl; each group —N< >X— is selected from piperidinyl and piperazinyl; $R^{23}$ is a single bond; and e is an integer selected from 2 and 3.

Specific embodiments of Formula 1-4 include:

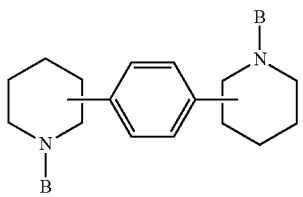

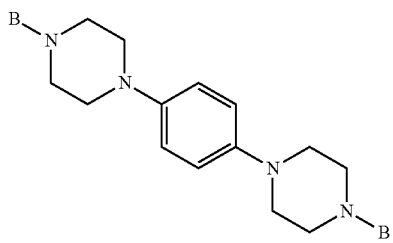

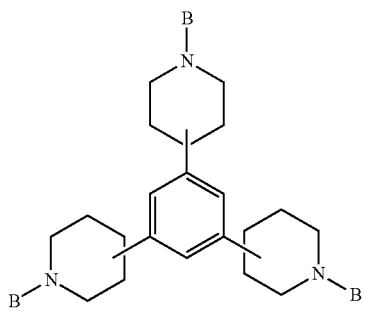

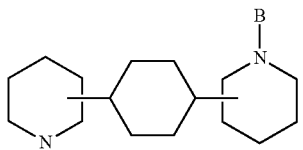

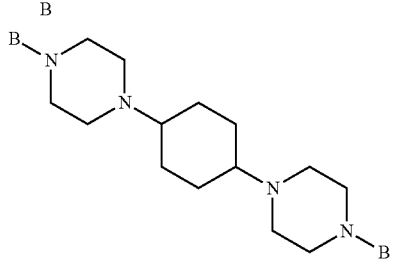

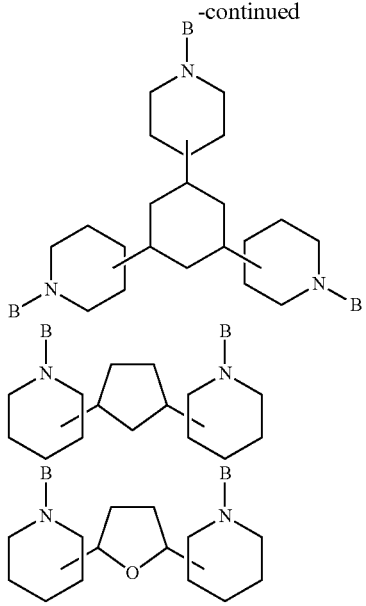

Embodiment 5

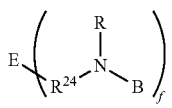

(Formula 1-5)

wherein E is a 6- to 10-membered cycloaliphatic or aromatic group, each $R^{24}$ is independently selected from a single bond and $C_1$-$C_2$ alkyl, each R is independently selected from B, $C_1$-$C_6$ alkyl and benzyl, and f is an integer selected from 2 and 3.

Preferably in Formula 1-5, E is selected from cyclohexyl and phenyl; R' is a single bond, R is selected from B, $C_1$-$C_4$ alkyl and benzyl; and f is an integer selected from 2 and 3.

Specific embodiments of Formula 1-5 include:

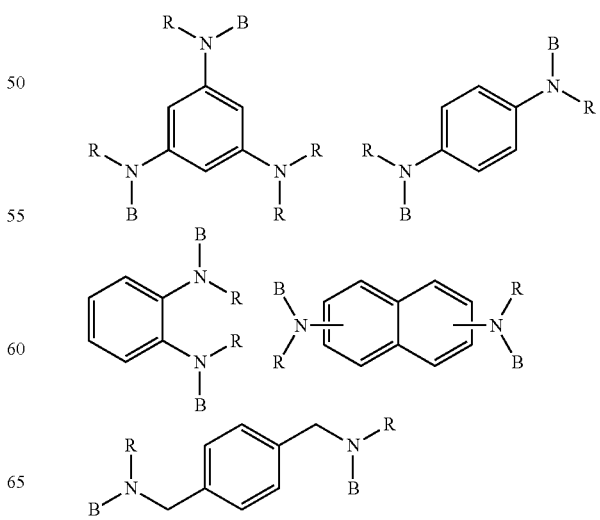

-continued

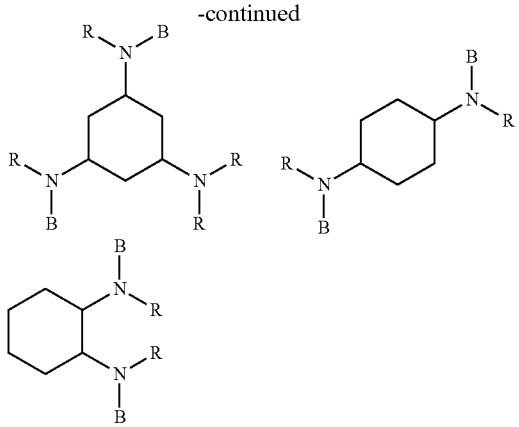

wherein each R is independently selected from B, $C_1$-$C_6$ alkyl and phenyl.

Initiator Compound Obtainable from the Compound of Formula 1

The initiator compound used in alternative step (a') in the first aspect of the invention is obtainable by reacting a compound of Formula 1 as defined above, including all embodiments thereof, with an organo-alkali metal compound.

Suitable exemplary organo-alkali metal compounds include methyllithium, ethyllithium, n-butyllithium, s-butyllithium, t-butyllithium, t-octyllithium, isopropyllithium, phenyllithium, cyclohexyllithium, 2-butyllithium, 4-phenylbutyllithium, t-butyldimethylsilyloxypropyllithium, dialkylaminopropyl lithium, N-morpholinopropyllithium, sodium biphenylide, sodium naphthalenide and potassium naphthalenide, 1,3-bis(1-(phenyl) 1-lithiohexyl)benzene, 1,3-bis(1-(4-ethylphenyl) 1-lithiohexyl)benzene, 1,3-bis(1-(4-methylphenyl) 1-lithiohexyl)benzene, 1,3-bis(1-(4-propylphenyl) 1-lithiohexyl)benzene, 1,3-bis(1-(4-(tert-butyl)phenyl) 1-lithiohexyl)-benzene, 1,3-bis(1-(4-(diethyl amino)phenyl) 1-lithiohexyl)benzene, 1,3-bis(1-(4-(dimethylamino)phenyl) 1-lithiohexyl)benzene, 1,3-bis(1-(4-ethoxyphenyl) 1-lithiohexyl)-benzene, 1,3-bis(1-(4-(dimethoxy)phenyl) 1-lithiohexyl)benzene, (((dimethylamino)dimethyl-silyl)methyl)lithium, (((diethylamino)dimethylsilyl)methyl)lithium, (((dibutylamino)dimethyl-silyl)methyl)lithium, (((dihexylamino)dimethylsilyl)methyl)lithium, (((dioctylamino)dimethyl-silyl)methyl)lithium, (((dibenzylamino)dimethylsilyl)methyl)lithium, ((dimethyl(piperidin-1-yl)silyl)methyl) lithium, ((dimethyl(morpholino)silyl)methyl)lithium, ((dimethyl(4-methyl-piperazin-1-yl)silyl)methyl)lithium, ((dimethyl(4-ethylpiperazin-1-yl)silyl)methyl)lithium, and ((dimethyl(4-benzylpiperazin-1-yl)silyl)methyl)lithium.

More preferably, the initiator com-pound is a monolithium alkyl, alkylaryl or aryl compound.

The initiator compound obtainable from the compound of Formula 1 can be prepared in an inert solvent and in the presence of randomizer compounds, and suitable solvents are the same as they are used in solution polymerization as defined below.

In another embodiment, the initiator compound obtainable from the compound of Formula 1 can be prepared in an inert solvent without using a randomizer compound, and suitable solvents are the same as they are used in solution polymerization as defined below.

Preparation of Compound of Formula 1

Generally, in accordance with the second aspect of the present invention, the compounds of Formula 1 are prepared by reacting, in the presence of a base, an amine having at least two groups independently selected from a primary amino group and a secondary amino group with a silane of the following Formula 3:

$$X-Si(R^1)(R^2)(R^3)$$ (Formula 3)

wherein
X is selected from Cl, Br, I, trifluoromethanesulfonate (OTf) and tosylate (OTos);
$R^1$, $R^2$ and $R^3$ are each independently selected from vinyl, butadienyl, methyl, ethyl, propyl, butyl, hexyl, octyl, benzyl and phenyl, with the proviso that at least one of $R^1$, $R^2$ and $R^3$ is selected from vinyl and butadienyl.

Useful silanes of Formula 3 for preparing a compound of Formula 1 include chlorodi($C_1$-$C_4$ alkyl)vinylsilanes, especially chlorodimethylvinylsilane, chlorodiethylvinylsilane and chlorodiphenylvinylsilane, preferably chlorodimethylvinylsilane.

The amine having a least two primary or secondary amino groups structurally corresponds to the group A in Formula 1, yet having at least two primary or secondary amino groups instead of the corresponding tertiary amino groups.

Thus, in Embodiment 1, the amine used for preparing the compound of Formula 1-1 can be selected from phenylene diamine, $C_2$-$C_4$ monoalkylene diamines, $C_2$-$C_4$ dialkylene triamines and $C_2$-$C_4$ trialkylene tetraamines, preferably from monoethylene diamine, diethylene triamine, dipropylene triamine, triethylene tetraamine and tetraethylene pentamine.

In Embodiment 2, the amine used for preparing the compound of Formula 1-2 can be selected from piperazine and 1,7-dioxa-4,10-diazacyclododecane.

In Embodiment 3, the amine used for preparing the compound of Formula 1-3 can be selected from triethylene tetramine, 4,4'-trimethylenedipiperidine, 4,4'-ethylenedipiperidin and 1-(3-piperazin-1-ylpropyl)piperazine.

In Embodiment 4, one amine used for preparing the compound of Formula 1-4 can be 1,4-di(piperazin-1-yl)benzene (made from e.g. 1,4-dibromobenzene and piperazine). Saturated amines used for preparing compounds of Formula 1-4 can be made by transition metal catalyzed hydrogenation of the corresponding aromatic amines.

In Embodiment 5, the amine used for preparing the compound of Formula 1-5 can be selected from 1,2-cyclohexandiamine, o- or p-phenylenediamine, 1,3,5-triaminobenzene, 1,5-diaminonaphthalene and 1,8-diaminonaphthalene.

Generally, the amine and the silane of Formula 3 will be reacted in proportions so as to attach at least two groups B to the amine, for example by using a molar ratio of amine to silane of Formula 3 in the range of from 0.5 to 0.1 (depending on the number of amines). For each mol of primary and secondary amino groups, 1 to 3 moles of silane of Formula 3 are used.

The preparation of the compound of Formula 1 can also involve the (partial) reaction between the amine and a silane other than a silane of Formula 3. In such case, the reaction between the amine, the silane of Formula 3 and the other silane can be carried out sequentially, for example reacting the amine firstly with the silane of Formula 3 and secondly with the other silane or vice versa.

The base is preferably selected from tertiary aliphatic or aromatic amines such as triethylamine, pyridine and 1,4-diazabicyclo[2.2.2]octane (DABCO) or substituted amidines or guanidines such as 1,8-diazabicycloundecene (DBU), 1,5-diazabicyclo[4.3.0]non-5-ene (DBN), 1,1,3,3-tetramethyl guanidine, preferably triethylamine and pyridine. The base is generally used in a total amount of 0.5 to 5 mol per mol of primary and secondary amino groups, preferably 1 to 3 mol per mol of primary and secondary amino groups. It is also possible to use the amine having a least two primary or secondary amino groups as the base, yet it will then be necessary to increase its amount accordingly, usually by 1.5-5 equivalents. It is important to ensure an excess of base as compared to the silane reactant, in terms of molar amounts, so that all HX generated in the reaction can be captured (quenched) by base.

The reaction can be carried out in a solvent, especially in an inert solvent, such as a hydrocarbon solvent, including pentane, n-hexane, cyclohexane, heptane, benzene and toluene, an ether solvent, including diethylether, tetrahydrofuran and tert-butylmethylether, a chlorinated solvent, including chloroform, tetrachloromethane and dichloromethane, an ester solvent such as ethyl acetate and methyl acetate, or other dipolar solvents such as acetone, dimethylformamide and acetonitrile. Preferred solvents are dichloromethane, chloroform, diethylether, ethyl acetate, toluene and cyclohexane. The total concentration of the reactants in the solvent is usually in the range of from 0.1 to 2 M.

The reaction between the amine and the silane of Formula 3 can be carried out under conditions as they will be apparent to a person skilled in the art, for example from reactions used for reacting an amine with a halosilane.

The reaction can suitably be carried out at a temperature of from −30° C. to the reflux temperature of the reaction mixture, preferably from 0° C.-25° C.

Usually, the reaction is carried out by dropwise adding the silane of Formula 3, in solution or neat, to a solution of the amine and the base. The reaction mixture is stirred and reacted for a sufficient time, generally for several hours and preferably for at least one hour, at a temperature of usually of 0° C. to the reflux temperature. After termination or completion of the reaction, any insoluble salts formed in the course of the reaction can be filtered off, the solvent can be removed by distillation under reduced pressure, and purification such as via vacuum distillation or recrystallization provides the compound of Formula 1.

Stabilizer Compound of Formula 2

The stabilizer compound of Formula 2 used in the first aspect of the present invention is characterized by having attached to the silicon atom of a vinyl, butadienyl or isoprenyl aminosilane at least one amino group. The stabilizing performance can be further improved by having attached to said silicon atom in combination both an amino group and a siloxy group.

$C_1$-$C_{18}$ hydrocarbyl for R''' in Formula 2 is preferably independently selected from $C_1$-$C_{18}$ alkyl, $C_2$-$C_{18}$ alkenyl, $C_6$-$C_{18}$ aryl and $C_7$-$C_{18}$ alkylaryl, preferably methyl, ethyl, isopropyl, tert-butyl, phenyl and benzyl. Specific exemplary trihydrocarbylsiloxy groups formed by the combination of R''' and the siloxy (—O—Si) group are tert-butyldimethylsiloxy, triethylsiloxy, triisopropylsiloxy, triphenylsiloxy, tert-butyldiphenylsiloxy, diethylisopropylsiloxy, dimethyloctadecylsiloxy and trihexylsiloxy.

R' is preferably independently selected from methyl, ethyl, n-propyl, n-butyl, isobutyl, pentyl, hexyl and benzyl. In one embodiment, the two R' groups are each an ethyl group, which are again connected via an oxygen atom, thus forming a morpholine ring with the Si-bonded nitrogen atom. In another embodiment, the two R' groups are connected to form, together with the Si-bonded nitrogen atom, a 5- to 12-membered ring, such as a cyclopentylamine group, cyclohexylamine group, a cycloheptylamine group, a cyclooctylamine group, a cyclododecylamine group, a morpholine group, an oxazolidine group, a thiazolidine group, a thiamorpholine group, a 4-methylpiperazine group, a 4-ethylpiperazine group, a 4-propylpiperazine group, a 4-butylpiperazine group and a 4-benzylpiperazine group, preferably a 5- to 8-membered ring. In one embodiment, one R' represents a group —Si(CR$_c$=CR$_a$R$_b$)(OSiR'''$_3$)$_y$(R'')$_z$, wherein R$_a$, R$_b$, R$_c$, R''', R'', y and z are independently as defined above and y+z=2.

$C_1$-$C_6$ hydrocarbyl for R'' can be selected from $C_1$-$C_6$ alkyl and phenyl. It is preferably methyl.

R$_a$, R$_b$ and R$_c$ are preferably identical and are even more preferably hydrogen. In one embodiment, only one of R$_a$, R$_b$ and R$_c$ is vinyl, while the remaining two are hydrogen. In a preferred embodiment, x, y and z are each 1 and m is 0. In another preferred embodiment, x=2, y=0, z=1 and m=0. In another preferred embodiment, x=1, y=0, z=2 and m=1 and at least one of R$_a$, R$_b$ and R$_c$ is vinyl.

In preferred embodiments of the vinylsilane compound of Formula 1, the parameters and substituents take the following values:

a) R''' is (methyl, methyl, t-butyl) or (phenyl, phenyl, phenyl) or (t-butyl, phenyl, phenyl) or (hexyl, hexyl, hexyl); R' is independently selected from methyl, ethyl, n-propyl, n-butyl, pentyl, hexyl, heptyl, octyl and benzyl (bonded via methyl group), or NR'R' forms a morpholine group, pyrrolidine group, piperidine group or oxazolidine group; R'' is methyl; R$_a$, R$_b$ and R$_c$ are each hydrogen; and x=y=z=1 b) R''' is (methyl, methyl, t-butyl) or (hexyl, hexyl, hexyl); R' is independently selected from methyl and ethyl, or NR'R' forms a morpholine group, pyrrolidine group, piperidine group or oxazolidine group; R'' is methyl; R$_a$, R$_b$ and R$_c$ are each hydrogen; and x=2, y=1 and z=0 c) R''' is (methyl, methyl, t-butyl) or (hexyl, hexyl, hexyl); R' is independently selected from methyl and ethyl, or NR'R' forms a morpholine group, pyrrolidine group, piperidine group or oxazolidine group; R'' is methyl; R$_a$ and R$_b$ are each hydrogen and R$_c$ is vinyl; and x=y=z=1

Generally, it is preferred to select bulkier substituents for group OSiR'''$_3$ the smaller the substituents in group NR'$_2$ are.

Preferred embodiments of the vinylsilane compound of Formula 2 are (tert-butyldimethyl-siloxy)methyl-4-morpholino(vinyl)silane, (tert-butyldimethylsiloxy)(dimethylamino)-methyl-(vinyl)silane, (tert-butyldimethylsiloxy)(diethylamino)methyl(vinyl)silane, (tert-butyldimethyl-siloxy)(dibutylamino)methyl(vinyl)silane, (tert-butyldimethylsiloxy)-(dibenzylamino)methyl-(vinyl)silane, 1-[(tert-butyldimethylsiloxy)methyl(vinyl)silyl]-4-ethylpiperazine, 1-[(tert-butyldimethylsiloxy)methyl(vinyl)silyl]-4-methylpiperazine, 4-ethyl-1-(dimethyl(2-methylenebut-3-en-1-yl)silyl)piperazine, 1-[(tert-butyldimethylsiloxy)methyl(vinyl)silyl]-4-benzylpiperazine and 1-[(tert-butyldimethylsiloxy)methyl(vinyl)silyl]-4-propylpiperazine.

The preparation of compounds of Formula 2 with m=0 as well as further details of such compounds is described in WO2015/055252, incorporated herein by reference in its entirety. Compounds of Formula 2 with m=1 can be prepared by reacting a compound of the following Formula 4 and a compound of the following Formula 5 in the presence of (i) a metal selected from the group consisting of magnesium, zinc, aluminum and boron and (ii) a transition metal catalyst in a solvent, or by using variations thereof:

Formula 4

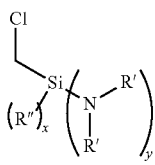

Formula 5

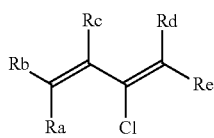

wherein
- each R' is independently selected from $C_1$-$C_{12}$ alkyl, $C_6$-$C_{18}$ aryl, $C_7$-$C_{18}$ alkylaryl, tri($C_1$-$C_6$ alkyl, $C_6$-$C_{12}$ aryl or $C_7$-$C_{18}$ alkylaryl)silyl and allyl, wherein two R' groups may be connected to form a ring and the ring may contain, further to the Si-bonded nitrogen atom, one or more of an oxygen atom, a nitrogen atom, an >N($C_1$-$C_6$ alkyl or $C_7$-$C_{18}$ alkylaryl) group and a sulfur atom;
- each R" is independently selected from $C_1$-$C_6$ hydrocarbyl;
- $R_a$, $R_b$, $R_c$, $R_d$ and $R_e$ are independently selected from hydrogen, methyl and ethyl;
- x is an integer selected from 0, 1 and 2, y is an integer selected from 1, 2 and 3 and X+y=3.

Polymerization

The compound of Formula 1 is used as a branching agent for introducing reversible branching in an elastomeric polymer. For this purpose, it can be used—as such or after reaction with an organo-alkali metal compound to generate an initiator compound—already in the polymerization reaction which is carried out for preparing the elastomeric polymer, or it can be added to and reacted with a living elastomeric polymer. Two or more compounds of Formula 1 may be used in combination. In each case, the polymerization or reaction is carried out in the presence of a stabilizer compound of Formula 2, and two or more stabilizer compounds of Formula 2 may be used in combination.

The elastomeric polymer can be prepared generally via anionic, radical or transition metal-catalyzed polymerization, but is preferably prepared by anionic polymerization. The polymerization may be conducted in a solvent and may be carried out with one or more of chain end-modifying agents, further coupling agents (including modified coupling agents), randomizer compounds and polymerization accelerator compounds.

Further to the following specific disclosure, generally applicable directions on polymerization technologies including polymerization initiator compounds, polar coordinator compounds and accelerators (for increasing/changing the reactivity of the initiator, for randomly arranging aromatic vinyl monomers and/or for randomly arranging and/or changing the concentration of 1,2-polybutadiene or 1,2-polyisoprene or 3,4-polyisoprene units introduced in the polymer); the amounts of each compound; monomer(s); and suitable process conditions are described in WO 2009/148932, which is fully incorporated herein by reference.

Conjugated Dienes (Conjugated Diene Monomers)

Exemplary conjugated diene monomers useful in the present invention include 1,3-butadiene, 2-($C_1$-$C_5$ alkyl)-1,3-butadiene such as isoprene (2-methyl-1,3-butadiene), 2,3-dimethyl-1,3-butadiene, 1,3-pentadiene, 2,4-hexadiene, 1,3-hexadiene, 1,3-heptadiene, 1,3-octadiene, 2-methyl-2,4-pentadiene, cyclopentadiene, 2,4-hexadiene, α- and β-farnesene and 1,3-cyclooctadiene. A mixture of two or more conjugated dienes may be used. Preferred conjugated dienes include 1,3-butadiene and isoprene. In one embodiment, the conjugated diene is 1,3-butadiene.

Aromatic Vinyl Monomers

The optional aromatic vinyl monomers include monovinylaromatic compounds, i.e. compounds having only one vinyl group attached to an aromatic group, and di- or higher vinylaromatic compounds which have two or more vinyl groups attached to an aromatic group. Exemplary aromatic vinyl monomers optionally used together with the at least one conjugated diene include styrene, $C_{1-4}$ alkyl-substituted styrene such as 2-methylstyrene, 3-methylstyrene, 4-methylstyrene, 2,4-dimethylstyrene, 2,4,6-trimethylstyrene, α-methylstyrene, 2,4-diisopropylstyrene and 4-tert-butylstyrene, stilbene, vinyl benzyl dimethylamine, (4-vinylbenzyl) dimethyl amino ethyl ether, N,N-dimethylamino ethyl styrene, 4-(N,N-diethylaminodimethyl)silyl styrene, 4-(dimethylaminodimethyl)silyl styrene, 4-((4-ethylpiperazinyl)dimethyl)silyl styrene, 4-((4-methylpiperazinyl)dimethyl)silyl styrene, tert-butoxystyrene, vinylpyridine and divinylaromatic compounds such as 1,2-divinylbenzene, 1,3-divinylbenzene and 1,4-divinylbenzene. Two or more aromatic vinyl monomers may be used in combination. A preferred aromatic vinyl monomer is a monovinylaromatic compound, more preferably styrene.

The monovinylaromatic compound(s), especially including styrene, may be used, depending on the application, in total amounts of up to 70 wt. %, in particular 40-70 wt. %, or 15-40 wt. %, or 1-15 wt. %, based on the total weight of monomers used in the polymerization reaction. The di- or higher vinylaromatic compounds such as divinylbenzene, including 1,2-divinylbenzene, 1,3-divinylbenzene and 1,4-divinylbenzene, may be used in total amount of 1 wt. % or less (based on the total molar weight of the monomers used to make the polymer). In one preferred embodiment, 1,2-divinylbenzene is used in combination with styrene and butadiene or isoprene.

Other Monomers

Comonomers other than the compound of Formula 1 or stabilizer of Formula 2, the conjugated diene monomer and the optional aromatic vinyl monomer, which may be used in preparing the elastomeric polymer of the invention, include acrylic monomers such as acrylonitrile, acrylates, e.g., acrylic acid, methyl acrylate, ethyl acrylate, propyl acrylate and butyl acrylate, and methacrylates, e.g., methyl methacrylate, ethyl methacrylate, propyl methacrylate and butyl methacrylate. Such other comonomers are usually used at a proportion of not more than 5 wt. %, based on the total weight of monomers used in the polymerization reaction.

Initiator Compounds

An initiator compound is used in the polymerization process of the present invention, and two or more initiator compounds may be used in combination. The initiator compound may be a monovalent or multivalent (divalent, trivalent, etc.) initiator compound. Suitable initiator compounds include alkali metals, organo-alkali metal compounds, a complex between an alkali metal and a polar compound, an oligomer containing an alkali metal, and Lewis acid-base complexes. Exemplary alkali metals include lithium, sodium, potassium, rubidium and cesium. Exemplary organo-alkali metal compounds include the same as itemized in the description of the initiator compound obtainable from the compound of Formula 1. Exemplary complexes between an alkali metal and a polar compound include a lithium-tetramethylethylenediamine complex, a lithium-tetrahydrofuran complex, a lithium-ditetrahydrofuranepropane complex, and the sodium and potassium analogues thereof. More preferably, the initiator compound is a mono- or dilithium alkyl, alkylaryl or aryl compound. Further useful initiators include the amino silane polymerization initiators described in WO2014/040640 and the polymerization initiators described in WO2015/010710.

In a particular embodiment, the initiator compound is one obtainable by reacting a compound of Formula 1 and an organo-alkali metal compound as defined above. In this embodiment, the initiator compound is capable of performing the functions of both initiator compound and branching agent.

The total amount of the initiator(s), in particular the organolithium initiator(s), will be adjusted depending on the monomer and target molecular weight or the polymer. The total amount is typically from 0.05 to 5 mmol, preferably from 0.2 to 3 mmol per 100 grams of monomer. Low molecular weight polymers may be prepared by using 5 to 20 mmol of initiator per 100 g of monomer.

Solvent

The polymerization is usually conducted as a solution polymerization, wherein the formed polymer is substantially soluble in the reaction mixture, or as a suspension/slurry polymerization, wherein the formed polymer is substantially insoluble in the reaction medium. More preferably, the polymer is obtained in a solution polymerization. As the polymerization solvent, a hydrocarbon solvent is conventionally used which does not deactivate the initiator, catalyst or active polymer chain. The polymerization solvent may be a combination of two or more solvents. Exemplary hydrocarbon solvents include aliphatic and aromatic solvents. Specific examples include (including all conceivable constitutional isomers): propane, butane, pentane, hexane, heptane, butene, propene, pentene, hexane, octane, benzene, toluene, ethylbenzene and xylene.

Chain End-Modifying Agents

One or more chain end-modifying agents may be used in the polymerization reaction of the present invention for further controlling polymer properties by reacting with the terminal ends of the polymer chains in the polymer of the invention. Generally, silane-sulfide omega chain end-modifying agents such as disclosed in WO 2007/047943, WO 2009/148932, U.S. Pat. No. 6,229,036 and US 2013/0131263, each incorporated herein by reference in its entirety, can be used for this purpose. Other chain end-modifying agents suitable for use in the present invention are those disclosed in WO2014/040640 and WO2015/010710 and the silane sulfide modifiers described in WO2014/040639, each of which is incorporated herein in its entirety.

The chain end-modifying agents may be added intermittently (at regular or irregular intervals) or continuously during the polymerization, but are preferably added at a conversion rate of the polymerization of more than 80 percent and more preferably at a conversion rate of more than 90 percent. Preferably, a substantial amount of the polymer chain ends is not terminated prior to the reaction with the chain end-modifying agent; that is, living polymer chain ends are present and are capable of reacting with the modifying agent.

Coupling Agents

For further controlling polymer molecular weight and polymer properties, a coupling agent ("linking agent") can be used as an optional component in the process of the invention. A coupling agent will reduce hysteresis loss by reducing the number of free chain ends of the elastomeric polymer and/or reduce the polymer solution viscosity, compared with non-coupled essentially linear polymer macromolecules of identical molecular weight. Coupling agents such as tin tetrachloride may functionalize the polymer chain end and react with components of an elastomeric composition, for example with a filler or with unsaturated portions of a polymer. Exemplary coupling agents are described in U.S. Pat. Nos. 3,281,383, 3,244,664 and 3,692,874 (e.g., tetrachlorosilane); U.S. Pat. Nos. 3,978,103, 4,048,206, 4,474,908 and 6,777,569 (blocked mercaptosilanes); U.S. Pat. No. 3,078,254 (multi-halogen-substituted hydrocarbon, such as 1,3,5-tri(bromo methyl) benzene); U.S. Pat. No. 4,616,069 (tin compound and organic amino or amine compound); and U.S. 2005/0124740.

Generally, the chain end-modifying agent is added before, during or after the addition of the coupling agent, and the modification reaction is preferably carried out after the addition of the coupling agent.

The total amount of coupling agents used will influence the Mooney viscosity of the coupled polymer and is typically in the range of from 0.001 to 4.5 milliequivalents per 100 grams of the elastomeric polymer, for example 0.01 to about 1.5 milliequivalents per 100 grams of polymer.

Randomizer Compounds

Randomizer compounds as conventionally known in the art (also known as polar coordinator compounds) may optionally be added to the monomer mixture or polymerization reaction, in order to adjust the microstructure (i.e. the content of vinyl bonds) of the conjugated diene part of the polymer, or to adjust the composition distribution of any aromatic vinyl monomer and of the vinyl bonds in the polymer chain. A combination of two or more randomizer compounds may be used. Randomizer compounds useful in the invention are generally exemplified by Lewis base compounds. Suitable Lewis bases for use in the present invention are, for example, ether compounds such as diethyl ether, di-n-butyl ether, ethylene glycol diethyl ether, ethylene glycol dibutyl ether, diethylene glycol dimethyl ether, propylene glycol dimethyl ether, propylene glycol diethyl ether, propylene glycol dibutyl ether, ($C_1$-$C_8$ alkyl)tetrahydrofurylethers (including methyltetrahydrofurylether, ethyltetrahydrofurylether, propyltetrahydrofurylether, butyltetrahydrofurylether, hexyltetrahydrofurylether and octyltetrahydrofurylether), tetrahydrofuran, 2,2-(bistetrahydrofurfuryl)propane, bistetrahydrofurfurylformal, methyl ether of tetrahydrofurfuryl alcohol, ethyl ether of tetrahydrofurfuryl alcohol, butyl ether of tetrahydrofurfuryl alcohol, α-methoxytetrahydrofuran, dimethoxybenzene and dimethoxyethane, and tertiary amines such as triethylamine, pyridine, N,N,N',N'-tetramethyl ethylenediamine, dipiperidinoethane, methyl ether of N,N-diethylethanolamine, ethyl ether of N,N-diethylethanolamine, N,N-diethyl-ethanolamine and dimethyl N,N-tetrahydrofurfuryl amine. Examples of preferred randomizer compounds are identified in WO 2009/148932, incorporated herein by reference in its entirety.

The randomizer compound will typically be added at a molar ratio of randomizer compound to initiator compound of from 0.012:1 to 10:1, preferably from 0.1:1 to 8:1 and more preferably from 0.25:1 to about 6:1.

Accelerator Compounds

The polymerization can optionally include accelerators to increase the reactivity of the initiator (and, thus, to increase the polymerization rate), to randomly arrange aromatic vinyl monomers introduced into the polymer, or to provide a single chain of aromatic vinyl monomers, thus influencing the distribution of aromatic vinyl monomers in a living anionic elastomeric copolymer. Examples of accelerators include sodium alkoxides or sodium phenoxides and potassium alkoxides or potassium phenoxides, preferably potassium alkoxides or potassium phenoxides, such as potassium isopropoxide, potassium t-butoxide, potassium t-amyloxide, potassium n-heptyloxide, potassium benzyloxide, potassium phenoxide; potassium salts of carboxylic acids, such as isovaleric acid, caprylic acid, lauric acid, palmitic acid, stearic acid, oleic acid, linolenic acid, benzoic acid, phthalic acid and 2-ethyl hexanoic acid; potassium salts of organic sulfonic acids, such as dodecyl benzenesulfonic acid, tetradecyl benzenesulfonic acid, hexadecyl benzenesulfonic acid and octadecyl benzenesulfonic acid; and potassium salts of organic phosphorous acids, such as diethyl phosphite, diisopropyl phosphite, diphenyl phosphite, dibutyl phosphite, and dilauryl phosphite.

Such accelerator compounds may be added in a total amount of from 0.005 to 0.5 mol per 1.0 gram atom equivalent of lithium initiator. If less than 0.005 mol is added, a sufficient effect is not typically achieved. On the other hand, if the amount of the accelerator compound is more than about 0.5 mol, the productivity and efficiency of the chain end modification reaction can be significantly reduced.

Dosing of Compound of Formula 1

The dosing of the compound of Formula 1 is dependent on the desired coupling rate which again has an impact on the polymer performance. Usually a coupling rate between 5 to 80% is desired. Thus, the compound of Formula 1 can be used in a total amount of from 0.01-5 equivalents (eq.) per equivalent of initiator compound, preferably 0.05-2 eq./eq., more preferably 0.1-1.0 eq./eq., most preferably 0.15-0.8 eq./eq. In alternative (a"), the corresponding dosing applies, while using the equivalents of living polymer chain ends as the "equivalents of initiator compound". The equivalents of living polymer chain ends can be determined by titration (e.g., Gilman titration) or via spectroscopic methods (UV spectroscopy), as is conventionally known in the art. When the compound of Formula 1 is used as an initiator compound (alternative (a')), i.e. after reaction with an excess of one or more organo-alkali metal compounds, it is preferably used in the following ratio: 0.05-0.9 eq./eq. total amount of organo-alkali metal compounds, more preferably: 0.1-0.5 eq./eq. total amount of organo-alkali metal compounds. The above amounts apply in particular when the polymer of the invention is used in tire applications, for example in a rubber compound for a tire tread or tire sidewall. Different compounds of Formula 1 may be used in combination in accordance with the present invention.

The mode of addition ("dosing") of the compound of Formula 1 in the polymerization process or reaction relative to the conjugated diene monomer and optional aromatic vinyl monomer, initiator compound and other components will affect the structure of the resulting polymer. Thus, statistical copolymers and block copolymers having blocks of multi(vinyl or butadienyl)-amino-silane polymer and blocks of other monomers in desired proportions and sequences can be prepared. Exemplary dosing schemes are as follows:

(1) Continuous (incremental) addition of the compound of Formula 1 to a mixture comprising conjugated diene monomer, optionally aromatic vinyl monomer, and initiator compound, as the polymerization proceeds, results in the provision of a statistical copolymer.

(2) Dosing of compound of Formula 1 before addition of main amount of initiator together with main amounts of comonomers. After quantitative or close to quantitative conversion of monomers, a second addition of compound of Formula 1 can be performed to generate block structure at polymer end.

(3) Dosing of compound of Formula 1 before addition of main amount of initiator together with main amounts of comonomers, which can be added after quantitative or close to quantitative conversion of compound of Formula 1. Additionally, several dosing steps of compound of Formula 1 in variable proportions can be made at defined degrees of conversion of total monomer to generate n tapered or block structure elements within the polymer chain. After quantitative or close to quantitative conversion of monomers, a final addition of compound of Formula 1 or a chain-end modifying agent or coupling agent can be used to generate block structure or another functionalization or coupling at polymer end.

(4) Several dosing steps of compound of Formula 1 in variable proportions can be made at defined degrees of conversion of total monomer to generate tapered or block structure elements within the polymer chain. After quantitative or close to quantitative conversion of monomers, a final addition of compound of Formula for a chain-end modifying agent or coupling agent can be used to generate block structure or another functionalization or coupling at polymer end.

(5) Dosing of compound of Formula 1 before addition of main amount of initiator together with main amounts of comonomers (tapered structure), which can be added after quantitative or close to quantitative conversion of compound of Formula 1 to generate block structure. After quantitative or close to quantitative conversion of monomers, chain-end modifying agent or coupling agent can be added to functionalize or couple polymer chains, which is a preferred dosing option.

Dosing of Stabilizer Compound Formula 2

The dosing of compound of Formula 2 is not only a function of the dosing amount of the compound of Formula 1 and the effectivity of the stabilizer compound of Formula 2 but also of the molecular weight of the polymer and, thus, the "coupling concentration". Also the polymer workup condition and the water content of the dried rubber can influence the amount needed for best storage behavior. Therefore, the amount of the compound of Formula 2 should be adjusted and preferably optimized for each polymerization concerned.

Generally, the stabilizer compound of Formula 2 can be used in an amount of from 0.01-100 eq. of compound of Formula 2 per equivalent of initiator, preferably 0.05-20 eq./eq., more preferably 0.1-5 eq./eq., even more preferably not more than 0.9 eq./eq. In alternative (a"), the corresponding dosing applies, while using the equivalents of living polymer chain ends as the "equivalents of initiator compound". The equivalents of living polymer chain ends can be determined by titration (e.g. Gilman titration) or via spectroscopic methods (UV spectroscopy), as is conventionally known in the art.

The mode of addition ("dosing") of the compound of Formula 2 in the polymerization process or reaction relative to the conjugated diene monomer and optional aromatic vinyl monomer, initiator compound and other components can be selected in a way corresponding to the exemplary dosing schemes (1) (5) described above for the compound of Formula 1.

Polymer

The elastomeric polymer according to the second aspect of the invention is obtainable by the process of the present invention, namely by (a) polymerizing at least one conjugated diene and a compound of Formula 1 in the presence of an initiator compound, (a') polymerizing at least one conjugated diene in the presence of an initiator compound obtainable by reacting a compound of Formula 1 and an organo-alkali metal compound, or (a") reacting a living polymer, obtainable by anionically polymerizing at least one conjugated diene, with a compound of Formula 1, wherein each of (a), (a') and (a") is carried out in the presence of a stabilizer compound of Formula 2. The polymer of the invention may be a statistical, block or tapered copolymer, or an alpha- or alpha,omega-modified polymer where the compounds of Formulas 1 and 2 are incorporated in the polymer chain by means of their vinyl or butadienyl functions. The use of diinitiators such as dilithiated arenes can lead to double chain end-modified polymers. For the incorporation of the stabilizer compound of Formula 2 in the polymer, reference is made to WO2015/055252. The polymer obtained is generally a branched elastomeric polymer.

In preferred embodiments, the polymer of the invention is an SSBR (solution styrene butadiene rubber) with a preferred vinyl content of 15-80%, more preferred 30-75%, most preferred 40-70% (dependent on the specific application), a styrene content (depending on the specific application) in total amounts of 40-70 wt. %, or 15-40 wt. %, or 1-15 wt. %; a PBR (polybutadiene rubber) with a vinyl content of <15%; or 15-40%, or 40-80%; a PIR (polyisoprene rubber); an SSIR (solution styrene isoprene rubber); or an SSIBR (solution styrene isoprene butadiene rubber); more preferably an SSBR or PBR; even more preferably an SSBR, each being modified by incorporation of the multivinylaminosilane of Formula 1. In case of an SSBR, the elastomeric polymer is characterized by a glass transition temperature (Tg, determined by DSC) of −90 to 0° C., preferably −80 to −5° C., more preferably −70 to −10° C. The most preferred Tg for truck tire applications is −70 to −40° C., and the most preferred Tg for passenger car tire applications is −40 to −10° C.

Non-Cured Polymer Composition

The non-cured polymer composition of the third aspect of the present invention comprises the elastomeric polymer of the second aspect of invention and one or more further components selected from (i) components which are added to or formed as a result of the polymerization process used for making said polymer, (ii) components which remain after solvent removal from the polymerization process, and (iii) components which are added to the polymer after completion of the polymer manufacturing process. In particular, such components (i) to (iii) can be one or more components selected from oils (extender oils), fillers, stabilizers and further polymers (which are not the polymers of the invention). In particular, extender oils may be added after completion of the polymerization to the polymer solution, prior to solvent removal. In one embodiment, the polymer composition additionally comprises one or more vulcanizing agents.

In one embodiment, the non-cured (non-crosslinked or unvulcanized) polymer composition is obtained by conventional work-up of the reaction mixture obtained in the polymerization process. Work-up means the removal of the solvent using steam stripping or vacuum evaporation techniques.

In another embodiment, the non-cured polymer composition of the invention is obtained as a result of a further mechanical mixing process involving the worked-up reaction mixture (including the polymer of the invention), preferably in the form of a rubber bale (i.e. the product of a conventional compounding process in an internal mixer and/or by means of a two-roll mill), and at least one filler.

The following components are usually added in non-cured compositions used in tires: Extender oils, stabilizers, fillers, further polymers.

(Extender) Oils

In one embodiment, the polymer composition of the present invention comprises the elastomeric polymer of the invention in combination with one or more oils, especially mineral oils. For representative examples and classification of oils see WO 2009/148932 and US 2005/0159513, each of which is incorporated herein by reference in its entirety. Such oils include, for instance, conventionally known extender oils such as aromatic, naphthenic and paraffinic extender oils, for example MES (mild extraction solvate), TDAE (treated distillate aromatic extract), rubber-to-liquid (RTL) oils, biomass-to-liquid (BTL) oils, factices, extender resins or liquid polymers (such as liquid BR) having a median molecular weight (determined via GPC according to BS ISO 11344:2004) of from 500 to 20000 g/mol. When using a mineral oil as the extender oil, it is preferably one or more selected from DAE (Destillated Aromatic Extracts), RAE (Residual Aromatic Extract), TDAE, MES and naphthenic oils. The aforementioned oils comprise different concentrations of polycyclic aromatic compounds, parafinics, naphthenics and aromatics, and have different glass transition temperatures. In some embodiments, MES, RAE and TDAE are preferred extender oils for rubber.

The one or more oils can be added to the polymer prior to or after the termination of the polymerization process. When the extender oil is added to the polymer solution, the timing of addition should preferably be after modification of the polymer or termination of the polymerization, for example after the addition of the modifying agent or polymerization termination agent. After the addition of extender oil, the oil-extended polymer composition can be obtained by separating any polymerization solvent from the polymer by means of a direct drying method or steam stripping, drying the rubber using a vacuum dryer, hot-air dryer, roller and the like.

The polymer composition may have contain one or more oils in a total amount of from 0 to 70 phr, preferably 0.1 to 60 phr, more preferably 0.1 to 50 phr. When liquid polymers are used as extender oils in the polymer composition of the present invention, they are not taken into account when calculating the composition of the polymer matrix.

In another embodiment, the oil is added to the "solvent-free" polymer in a mechanical mixer together with at least one filler, preferably with at least one filler and at least one further polymer.

Fillers

The polymer composition of the invention, which optionally comprises one or more extender oils as defined above, may further comprise one or more fillers. Filler can be added to the polymer prior to or after the termination of the polymerization process. Examples of suitable fillers include carbon black (including electroconductive carbon black), carbon nanotubes (CNT) (including discrete CNT, hollow carbon fibers (HCF) and modified CNT carrying one or more functional groups, such as hydroxyl, carboxyl and carbonyl groups), graphite, graphene (including discrete graphene platelets), silica, carbon-silica dual-phase filler, clays (layered silicates, including exfoliated nanoclay and organoclay), calcium carbonate, magnesium carbonate, magnesium oxide, titanium dioxide, rubber gels, lignin, cellulose, amorphous fillers, such as glass particle-based fillers, starch-based fillers, and combinations thereof. Further examples of suitable fillers are described in WO 2009/148932, which is fully incorporated herein by reference.

Any type of carbon black conventionally known to a person of skill in the art may be used. In one embodiment, the carbon black has an iodine number according to ASTM D 1510 of 20 to 250 mg/g, preferably 30 to 180 mg/g, more preferably 40 to 180 mg/g, and even more preferably 40 to 130 mg/g, and a DBP number according to ASTM D 2414 of 80 to 200 ml/100 g, preferably 100 to 200 ml/100 g, more preferably 115 to 200 ml/100 g (the DBP number determines the specific absorption volume of carbon black or of any bright filler by means of dibutyl phthalate).

Any type of silica conventionally known to a person of skill in the art and suitable as filler for tire rubber blends may be used. It is particularly preferred to use highly dispersed, precipitated silica having an nitrogen surface area (BET surface area; according to DIN ISO 9277 and DIN 66132) of 35 to 350 $m^2/g$, preferably 35 to 260 $m^2/g$, more preferably 100 to 260 $m^2/g$ and even more preferably 130 to 235 $m^2/g$, and having a CTAB surface area (according to ASTM D 3765) of 30 to 400 $m^2/g$, preferably 30 to 250 $m^2/g$, more preferably 100 to 250 $m^2/g$ and even more preferably 125 to 230 $m^2/g$. Such silica results, e.g. in rubber blends for tire treads, to particularly beneficial physical properties of the vulcanizates. In addition, it may bring about advantages in the processing of the blend, namely by reducing the time required for blending, while maintaining product properties, thus improving productivity. Useful silicas include those of the type Ultrasil® VN3 (trademark of Evonik Industries) as well as highly dispersed types, so-called HD silicas (e.g. Zeosil® 1165 MP of Rhodia).

Stabilizers

One or more stabilizers ("antioxidants"; not to be confused with the stabilizer compounds of Formula 2) can optionally be added to the polymer prior to or after the termination of the polymerization process to prevent the degradation of the elastomeric polymer by molecular oxygen. Antioxidants based on sterically hindered phenols, such as 2,6-di-tert-butyl-4-methylphenol, 6,6'-methylenebis(2-tert-butyl-4-methylphenol), Iso-octyl-3-(3,5-di-tert-butyl-4-hydroxyphenyl) propionate, hexamethylenebis[3-(3,5-di-tert-butyl-4-hydroxy-phenyl)propionate], octadecyl-3-(3,5-di-tert-butyl-4-hydroxyphenyl) propionate, isotridecyl-3-(3, 5-di-tert-butyl-4-hydroxyphenyl) propionate, 1,3,5-trimethyl-2,4,6-tris(3,5-di-tert-butyl-4-hydroxybenzyl) benzene, 2,2'-ethylidenebis-(4,6-di-tert-butylphenol), tetrakis[methyl ene-3-(3,5-di-tert-butyl-4-hydroxyphenyl)propionate]methane, 2-[1-(2-hydroxy-3, 5-di-tert-pentylphenyl) ethyl]-4, 6-di-tert-pentylphenyl acrylate and 2-tert-butyl-6-(3-tert-butyl-2-hydroxy-5-methylbenzyl)-4-methylphenyl acrylate, and antioxidants based on thio-esters, such as 4,6-bis(octylthiomethyl)-o-cresol and pentaerythrityl tetrakis(3-laurylthiopropionate), are typically used. Further examples of suitable stabilizers can be found in F. Röthemeyer, F. Sommer, Kautschuk Technologie, $2^{nd}$ ed., (Hanser Verlag, 2006) pages 340-344, and references cited therein.

Further Polymers

Apart from polymer of the invention, extender oil(s), filler(s), etc., the polymer composition of the invention may additionally contain further polymer, especially further elastomeric polymer. Further polymers may be added as solution to a solution of the inventive polymer prior to work up of the polymer blend or may be added during a mechanical mixing process, e.g. in a Brabender mixer.

Further (elastomeric) polymers as referred to herein are elastomeric polymers which are not in accordance with the polymer of the invention, i.e. which do not contain repeating units derived from both compounds of Formulas 1 and 2.

Vulcanizing Agents and Vulcanizing Accelerators

The polymer composition of the invention may optionally further comprise at least one vulcanizing agent. Any vulcanizing agent conventionally used in the manufacture of rubber products can be used in the invention, and a combination of two or more vulcanizing agents may be used.

Sulfur, sulfur-containing compounds acting as sulfur donors such as dithiols, sulfur accelerator systems and peroxides are the most common vulcanizing agents. Examples of sulfur-containing compounds acting as sulfur donors include dithiodimorpholine (DTDM), tetramethylthiuram disulfide (TMTD), tetraethyl thiuram disulfide (TETD) and dipentamethylene thiuram tetrasulfide (DPTT). Examples of sulfur accelerators include amine derivates, guanidine derivates, aldehydeamine condensation products, thiazoles, xanthogenates, thiuram sulfides, dithiocarbamates and thiophosphates. It is preferably to use one or more sulfonamide accelerators selected from N-cyclohexyl-2-benzothiazol sulfenamide (CBS), N,N-dicyclohexyl benzothiazole 2-sulfenamide (DCBS), benzothiazyl 2-sulfenemorpholide (MBS) and N-tert-butyl 2-benzothiazyl sulfenamide (TBBS). Further crosslinking systems such as available under the trade names Vulkuren® (1,6-bis(N,N-dibenzyl thiocarbamoyldithio)-hexane; Lanxess), Duralink® or Perkalink® (1,3-bis(citraconimidomethyl)benzene; Lanxess) or disclosed in WO 2010/049261 may be added to the polymer composition. Examples of peroxides include di-tert-butyl-peroxides, di-(tert-butyl-peroxy-trimethyl-cyclohexane), di-(tert-butyl-peroxy-isopropyl)benzene, dichlorobenzoylperoxide, dicumylperoxides, tert-butyl-cumyl-peroxide, dimethyl-di(tert-butyl-peroxy)hexane, dimethyl-di(tert-butyl-peroxy)hexane and butyl-di(tert-butyl-peroxy)valerate (*Rubber Handbook, SGF, The Swedish Institution of Rubber Technology* 2000).

A vulcanizing accelerator of the sulfene amide-type, guanidine-type or thiuram-type can be used together with a vulcanizing agent as required.

In addition, the polymer composition of the invention may contain conventional additives and vulcanization auxiliaries in proportions conventionally used. Such additives include:

a) aging inhibitors such as N-phenyl-N'-(1,3-dimethylbutyl)-p-phenylenediamine (6PPD), N,N'-diphenyl-p-phenylenediamine (DPPD), N,N'-ditolyl-p-phenylenediamine (DTPD), N-isopropyl-N'-isopropyl-N'-phenyl-p-phenylenediamine (IPPD), 2,2,4-trimethyl 1,2-dihydrochinolin (TMQ), b) activators such as zinc oxide and fatty acids (e.g. stearic acid), c) waxes, d) resins, especially adhesive resins, e) mastication additives such as 2,2'-dibenzamidodiphenyldisulfide (DBD) and f) processing additives such as zinc soaps and fatty acid esters and their derivatives. Zinc oxide (zinc white) is preferably used as a component of the sulfur accelerator system.

A vulcanizing agent is typically added to the polymer composition in an amount of from 0.5 to 10 parts by weight or, in some embodiments, 1 to 6 parts by weight per 100 parts by weight of the total polymer. Examples of vulcanizing accelerators and amounts thereof added with respect to the total polymer are given in WO 2009/148932, which is incorporated herein by reference in its entirety.

Vulcanized Polymer Composition and Process for its Preparation

The vulcanized polymer composition of the eighth aspect of the invention is obtained by vulcanizing a polymer composition of the seventh aspect of the invention comprising one or more vulcanizing agents, under conditions and with machinery conventionally known in the art. The vulcanization process constitutes the ninth aspect of the present invention.

Article Comprising Vulcanized Polymer Composition

Since the vulcanized polymer compositions of the invention exhibit low rolling resistance, low dynamic heat build-up and increased wet grip, they are well suited for use in manufacturing, e.g., tires or parts of tires including for example: tire treads, side walls and tire carcasses as well as other industrial products such as belts, hoses, vibration dampers and footwear components. Thus, the article of the tenth aspect of the present invention comprises at least one component formed from the vulcanized polymer composition of the invention. The article may be, for instance, a tire, a tire tread, a tire side wall, a tire carcass, a belt, a gasket, a seal, a hose, a vibration damper, a golf ball or a footwear component, such as a shoe sole.

DEFINITIONS

Alkyl groups as defined herein, whether as such or in association with other groups, such as alkylaryl or alkoxy, include both straight chain alkyl groups, such as methyl (Me), ethyl (Et), n-propyl (Pr), n-butyl (Bu), n-pentyl, n-hexyl, octyl (oct) etc., branched alkyl groups, such as isopropyl, tert-butyl, etc., and cyclic alkyl groups, such as cyclohexyl.

Aryl groups as defined herein include phenyl, biphenyl and other benzenoid compounds. Aryl groups preferably contain only one aromatic ring and most preferably contain a $C_6$ aromatic ring.

Alkylaryl groups as defined herein refer to a combination of one or more aryl groups bound to one or more alkyl groups, for example in the form of alkyl-aryl, aryl-alkyl, alkyl-aryl-alkyl and aryl-alkyl-aryl. Alkylaryl groups preferably contain only one aromatic ring and most preferably contain a $C_6$ aromatic ring.

The present invention will be explained in more detail by way of examples, which are not intended to be limiting the present invention.

EXAMPLES

Abbreviations Used within the Experimental Section

DCM: dichloromethane, EA: ethylacetate,

MTBE: tertbutylmethylether, rt: room temperature (approx. 25° C.)

TBS: tertbutyldimethylsilyl, TEA: triethylamine,

TES: triethylsilyl, TME: trimethylamine,

THF: tetrahydrofuran,

1) Preparation and Characterization of Branching Agents and Stabilizers a) Branching Agents $N^1$-<2-{Bis[dimethyl(vinyl)silyl]amino}ethyl>-$N^1$, $N^2,N^2$-tris[dimethyl(vinyl)silyl]-ethane-1,2-diamine (M1)

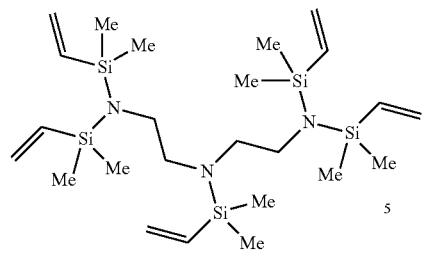

Diethylenetriamine (3.00 g, 29.1 mmol, 1.0 equiv.) was dissolved in DCM (125 ml) at rt. TEA (19.1 g, 189 mmol, 6.5 equiv.) was added followed by dropwise addition of chlorodimethylvinylsilane (22.8 g, 189 mmol, 6.5 equiv.) at 25° C. The reaction mixture was stirred at 25° C. for 7 d. Filtration and removal of all volatile materials furnished the title compound M1 (12.0 g, 23.0 mmol, 79%, purity: 91%) as yellow oil.

$C_{24}H_{53}N_3Si_5$, $M_w$=524.13 g mol$^{-1}$ $^1$H NMR (400 MHz, 20° C., $C_6D_6$): δ=6.29 (dd, J=20.3 Hz, J=14.6 Hz, 5H), 5.94 (dd, J=14.6 Hz, J=3.8 Hz, 5H), 5.74 (dd, J=20.3 Hz, J=3.8 Hz, 2H), 2.99-2.95 (m, 4H), 2.86-2.84 (m, 4H), 0.29 (s, 24H), 0.24 (s, 6H) ppm. $^{13}$C NMR (100 MHz, 20° C., $C_6D_6$): δ=141.26 (4 CH), 140.28 (CH), 132.23 (4 $CH_2$), 131.73 ($CH_2$), 53.43 (2 $CH_2$), 47.25 (2 $CH_2$), 1.09 (8 $CH_3$), −0.64 (2 $CH_3$) ppm. GC-MS (EI, 70 eV): m/z (%)=524 (M$^+$, 0.1), 325 (100), 283 (12), 212 (100), 198 (89), 172 (5), 128 (24), 85 (82).

$N^1,N^6$-(Ethane-1,2-diyl)bis{$N^1,N^2,N^2$-tris[dimethyl (vinyl)silyl]ethane-1,2-diamine}(M2)

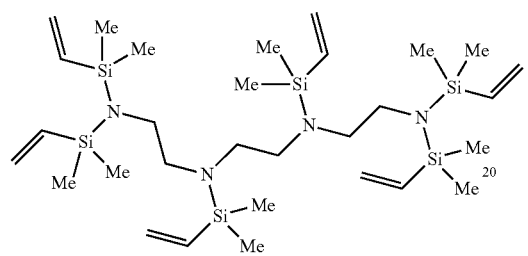

Triethylenetetramine (2.00 g, 13.7 mmol, 1.0 equiv.) was dissolved in DCM (60 ml) at rt. TEA (11.1 g, 109 mmol, 8.0 equiv.) was added followed by dropwise addition of chlorodimethylvinylsilane (13.2 g, 109 mmol, 8.0 equiv.) at 25° C. The reaction mixture was stirred at 25° C. for 7 d. Filtration and removal of all volatile materials furnished the title compound M2 (6.15 g, 9.44 mmol, 69%, purity: 80% of main isomer) as yellow oil.

$C_{30}H_{66}N_4Si_6$, $M_w$=651.40 g mol$^{-1}$

¹H NMR (400 MHz, 20° C., C₆D₆): δ=6.30 (dd, J=20.3 Hz, J=14.6 Hz, 4H), 6.25 (dd, J=20.0 Hz, J=14.8 Hz, 2H), 5.97 (dd, J=14.7 Hz, J=3.9 Hz, 2H), 5.96 (dd, J=14.6 Hz, J=3.8 Hz, 4H), 5.76 (dd, J=20.2 Hz, J=3.9 Hz, 2H), 5.75 (dd, J=20.3 Hz, J=3.8 Hz, 4H), 3.00-2.82 (m, 12H), 0.30 (s, 24H), 0.26 (s, 12H) ppm. ¹³C NMR (100 MHz, 20° C., C₆D₆): δ=141.14 (4 CH), 140.15 (2 CH), 132.18 (2 CH₂), 131.81 (4 CH₂), 52.74 (2 CH₂), 50.06 (2 CH₂), 46.52 (2 CH₂), 0.96 (8 CH₃), −0.91 (4 CH₃) ppm. GC-MS (EI, 70 eV): major isomer m/z (%)=452 (M⁺-199, 32), 369 (3), 325 (100), 256 (19), 212 (100), 198 (73), 142 (32), 85 (27); minor isomer m/z (%)=452 (M⁺-199, 100), 212 (2). Ratio 4.8:1 (GC).

1,4-Bis[dimethyl(vinyl)silyl]piperazine (M3)

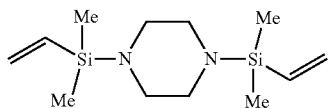 [SMILES: C=C[Si](C)(C)N1CCN([Si](C)(C)C=C)CC1]

Piperazine (8.00 g, 92.9 mmol) was dissolved in DCM (150 ml) at rt. TEA (21.6 g, 214 mmol, 2.3 equiv.) was added followed by dropwise addition of chlorodimethylvinylsilane (25.8 g, 214 mmol, 2.3 equiv.) at 25° C. The reaction mixture was stirred at 25° C. for 7 d. Filtration and removal of the solvent furnished a residue which was purified by vacuum distillation. The title compound M3 (17.4 g, 68.4 mmol, 74%) was received as colorless oil.

$C_{12}H_{26}N_2Si_2$, $M_w$=254.52 g mol⁻¹ bp=92-93° C. (5 mbar). ¹H NMR (400 MHz, 20° C., C₆D₆): δ=6.14 (dd, J=20.2 Hz, J=14.7 Hz, 2H), 5.94 (dd, J=14.7 Hz, J=4.1 Hz, 2H), 5.73 (dd, J=20.2 Hz, J=4.1 Hz, 2H), 2.97 (s, 8H), 0.12 (s, 12H) ppm. ¹³C NMR (100 MHz, 20° C., C₆D₆): δ=139.34 (2 CH), 132.15 (2 CH₂), 47.36 (4 CH₂), −2.43 (4 CH₃) ppm. GC-MS (EI, 70 eV): m/z (%)=254 (M⁺, 100), 239 (M⁺-CH₃, 9), 210 (2), 170 (9), 140 (20), 85 (44).

b) Monovinylsilanes and Stabilizers

Dimethyl(triethylsiloxy)(vinyl) silane (S1)*

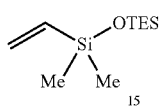

Chlorodimethylvinylsilane (1.63 g, 13.5 mmol, 1.05 equiv.) was added dropwise to a solution of triethylsilanol (1.70 g, 12.9 mmol, 1.0 equiv.) and triethylamine (1.51 g, 14.9 mmol, 1.2 equiv.) in cyclohexane (15 ml) at rt. The mixture was stirred for 16 h at rt. After filtration the solvent was removed under reduced pressure and distillation at 30 mbar furnished vinylsilane S1 (1.32 g, 6.1 mmol, 48%) as a colorless liquid.

$C_{10}H_{24}OSi_2$, $M_w$=216.47 g mol⁻¹ bp=95-97° C. (30 mbar). ¹H NMR (400 MHz, 20° C., C₆D₆): δ=6.20 (dd, J=20.3 Hz, J=14.9 Hz, 1H), 5.90 (dd, J=14.8 Hz, J=3.9 Hz, 1H), 5.76 (dd, J=20.3 Hz, J=4.0 Hz, 1H), 0.99 (t, J=7.9 Hz, 9H), 0.55 (q, J=7.8 Hz, 6H), 0.20 (s, 6H) ppm. ¹³C NMR (101 MHz, 20° C., C₆D₆): δ=139.85 (CH, vinyl), 131.72 (CH₂, vinyl), 7.06 (3 CH₃), 6.67 (3 CH₂), 0.60 (2 CH₃) ppm. GC-MS (EI, 70 eV): m/z (%)=216 (M⁺, 1), 187 (M⁺-C₂H₅, 100), 159 (M⁺-C₂H₃-2 CH₃, 69), 131 (M⁺-C₄H₉Si, 85), 59 (36).

Dimethyl(tert-butyldimethylsiloxy)(vinyl) silane (S2)*

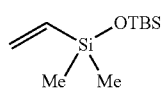

Chlorodimethylvinylsilane (11.2 g, 92.4 mmol, 1.0 equiv.) was added dropwise to a solution of tertbutyldimethylsilanol (12.2 g, 92.4 mmol, 1.0 equiv.) and triethylamine (10.3 g, 102 mmol, 1.1 equiv.) in cyclohexane (100 ml) at rt. The mixture was stirred at rt for 18 h. After filtration the solvent was removed under reduced pressure and distillation at 15 mbar furnished vinylsilane S2 (14.6 g, 67.4 mmol, 73%) as a colorless liquid.

$C_{10}H_{24}OSi_2$, $M_w$=216.47 g mol⁻¹ bp=49-51° C. (15 mbar). ¹H NMR (400 MHz, 20° C., C₆D₆): δ=6.17 (dd, J=20.3 Hz, J=14.8 Hz, 1H), 5.89 (dd, J=14.9 Hz, J=4.0 Hz, 1H), 5.75 (dd, J=20.3 Hz, J=4.0 Hz, 1H), 0.94 (s, 9H), 0.17 (s, 6H), 0.06 (s, 6H) ppm. ¹³C NMR (101 MHz, 20° C., C₆D₆): δ=139.75 (CH, vinyl), 131.79 (CH₂, vinyl), 25.89 (3 CH₃), 18.28 (C), 0.55 (2 CH₃), −2.71 (2 CH₃) ppm. GC-MS (EI, 70 eV): m/z (%)=216 (M⁺, 0.1), 201 (M⁺-CH₃, 3), 159 (M⁺-tertBu, 100), 131 (11), 145 (100), 73 (12).

1-[Dimethyl(vinyl)silyl]-4-methylpiperazine (S3)

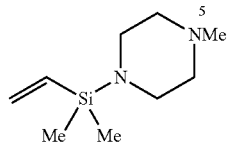

Chloromethylvinylsilane (12.1 g, 100 mmol, 1.0 equiv.) was added dropwise to a solution of methylpiperazine (11.0 g, 110 mmol, 1.1 equiv.) and LiH (0.95 g, 120 mmol, 1.2 equiv.) in MTBE (80 ml) at rt. The mixture was stirred for 18 h at rt. After filtration the solvent was removed under reduced pressure and distillation at 40 mbar furnished S3 (14.1 g, 76.5 mmol, 76%) as a colorless oil.

$C_9H_{20}N_2Si$, $M_w$=184.36 g mol⁻¹ bp=55-57° C. (0.2 mbar). ¹H NMR (400 MHz, 20° C., C₆D₆): δ=6.12 (dd, J=20.2 Hz, J=14.7 Hz, 1H), 5.93 (dd, J=14.7 Hz, J=4.1 Hz, 1H), 5.71 (dd, J=20.2 Hz, J=4.1 Hz, 1H), 2.88 (t, J=4.8 Hz, 4H), 2.14-2.11 (m, 4H), 2.11 (s, 3H), 0.10 (s, 6H) ppm. ¹³C NMR (101 MHz, 20° C., C₆D₆): δ=139.28 (CH, vinyl), 132.20 (CH₂, vinyl), 57.22 (2 CH₂), 47.00 (CH₃), 45.67 (2 CH₂), −2.32 (2 CH₃) ppm. GC-MS (EI, 70 eV): m/z (%)=184 (M⁺, 100), 169 (M⁺-CH₃, 24), 155 (5), 140 (22), 114 (28), 85 (C₄H₉Si', 42).

4-[(Dimethyl(vinyl)silyl]morpholine (S4)

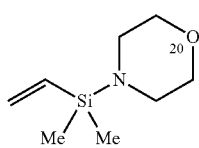

Chloromethylvinylsilane (14.1 g, 117 mmol, 1.0 equiv.) was added dropwise to a solution of morpholine (11.2 g, 128 mmol, 1.1 equiv.) and triethylamine (14.2 g, 140 mmol, 1.2 equiv.) in cyclohexane (100 ml) at rt. The mixture was stirred for 18 h at rt. After filtration the solvent was removed under reduced pressure and distillation at 40 mbar furnished S4 (14.6 g, 85.0 mmol, 73%) as a colorless oil.

$C_8H_{17}NOSi$, $M_w$=171.31 g mol$^{-1}$ bp=85° C. (37 mbar). $^1$H NMR (400 MHz, 20° C., $C_6D_6$): δ=6.05 (dd, J=20.0 Hz, J=14.7 Hz, 1H), 5.91 (dd, J=14.7 Hz, J=4.2 Hz, 1H), 5.67 (dd, J=20.0 Hz, J=4.2 Hz, 1H), 3.44-3.41 (m, 4H), 2.68-2.66 (m, 4H), 0.04 (s, 6H) ppm. $^{13}$C NMR (101 MHz, 20° C., $C_6D_6$): δ=138.71 (CH, vinyl), 132.49 ($CH_2$, vinyl), 68.61 (2 $CH_2$), 45.92 (2 $CH_2$), -2.77 (2 $CH_3$) ppm. GC-MS (EI, 70 eV): m/z (%)=171 (M$^+$, 70), 156 (M$^+$-$CH_3$, 32), 130 (19), 113 (30), 85 ($C_4H_9Si$ 100), 59 (65).

(tert-Butyldimethylsiloxy)methyl-4-morpholino(vinyl)silane (S5)

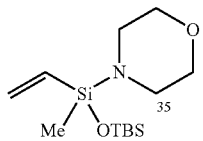

A solution of tert-butyldimethylsilanol (14.1 g, 106 mmol, 1.0 equiv.) in ethylacetate (60 ml) was added dropwise to a solution of dichlorovinylmethyl-silane (15.0 g, 106 mmol, 1.0 equiv.) and triethylamine (21.5 g, 213 mmol, 2.0 equiv.) in EA (200 ml) at room temperature. The mixture was stirred for 14 h at room temperature. Then morpholine (9.45 g, 108 mmol, 1.0 equiv.) was added and the mixture was stirred for a further 6 h. After filtration the solvent was removed under reduced pressure and distillation at 3 mbar furnished S5 (22.7 g, 78.9 mmol, 74%) as a colorless liquid.

$C_{13}H_{29}NO_2Si_2$, $M_w$=287.55 g mol$^{-1}$ bp=95-97° C. (1 mbar). $^1$H NMR (400 MHz, 20° C., $C_6D_6$): δ=6.02 (dd, J=19.3 Hz, J=14.7 Hz, 1H), 5.94 (dd, J=14.8 Hz, J=5.4 Hz, 1H), 5.83 (dd, J=19.0 Hz, J=5.4 Hz, 1H), 3.47 (t, J=4.6 Hz, 4H), 2.85-2.75 (m, 4H), 0.95 (s, 9H), 0.11 (s, 3H), 0.07 (s, 6H) ppm. $^{13}$C NMR (101 MHz, 20° C., $C_6D_6$): δ=137.06 (CH, vinyl), 133.73 ($CH_2$, vinyl), 68.56 (2 $CH_2$), 45.55 (2 $CH_2$), 25.92 (3 $CH_3$), 18.38 (C), -2.46 ($CH_3$), -2.75 (2 $CH_3$) ppm. GC-MS (EI, 70 eV): m/z (%)=287 (M$^+$, 6), 272 (M$^+$-$CH_3$, 9), 230 (M$^+$-$C_4H_9$, 100), 202 (4), 174 (6), 145 (39), 117 (16), 70 (22). IR (ATR): λ$^{-1}$=2953 (m), 2855 (w), 1473 (w), 1373 (w), 1256 (m), 1115 (m), 1047 (m), 963 (m), 834 (m), 775 (s), 742 (m), 684 (m) cm$^{-1}$.

(tert-Butyldimethylsiloxy)(dibutylamino)methyl(vinyl)silane (S6)

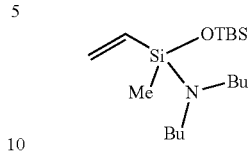

Tert-butyldimethylsilanol (9.38 g, 70.9 mmol, 1.00 equiv.) was added dropwise to a solution of dichloromethylvinylsilane (10.0 g, 70.9 mmol, 1.0 equiv.) and triethylamine (15.8 g, 156 mmol, 2.2 equiv.) in EA/chexane (150 ml) at room temperature. The mixture was stirred for 2.5 h at room temperature. Then dibutylamine (9.33 g, 72.3 mmol, 1.02 equiv.) was added and the mixture was stirred for a further 20 h. After filtration the solvent was removed under reduced pressure and distillation at 4 mbar furnished modifier S6 (18.1 g, 54.9 mmol, 77%) as a colorless liquid.

$C_{17}H_{39}NOSi_2$, $M_w$=329.67 g mol$^{-1}$ bp=133-135° C. (4 mbar). $^1$H NMR (400 MHz, 20° C., $C_6D_6$): δ=6.17 (dd, J=20.1 Hz, J=14.8 Hz, 1H), 5.96 (dd, J=14.8 Hz, J=4.3 Hz, 1H), 5.86 (dd, J=20.0 Hz, J=4.3 Hz, 1H), 2.84 (dd, J=8.4 Hz, J=6.9 Hz, 4H), 1.46 (pent, J=7.5 Hz, 4H), 1.25 (sext, J=7.4 Hz, 4H), 0.99 (s, 9H), 0.91 (t, J=7.4 Hz, 6H), 0.25 (s, 3H), 0.13 (s, 6H) ppm. $^{13}$C NMR (101 MHz, 20° C., $C_6D_6$): δ=138.60 (CH, vinyl), 132.66 ($CH_2$, vinyl), 46.12 (2 $CH_2$), 32.86 (2 $CH_2$), 26.02 (3 $CH_3$), 20.73 (2 $CH_2$), 18.50 (C), 14.38 (2 $CH_3$), -1.40 ($CH_3$), -2.64 ($CH_3$), -2.65 ($CH_3$) ppm. GC-MS (EI, 70 eV): m/z (%)=329 (M$^+$, 4), 315 (M$^+$, 12), 286 (100), 244 (7), 215 (2), 186 (12), 133 (75), 103 (7), 73 (18). IR (ATR): λ$^{-1}$=3053 (w), 2956 (m), 2929 (m), 2858 (w), 1463 (w), 1252 (m), 1163 (w), 1033 (s), 834 (s), 770 (s) cm$^{-1}$.

1-[(tert-Butyldimethylsiloxy)methylvinyl)silyl]-4-methylpiperazine (S7)

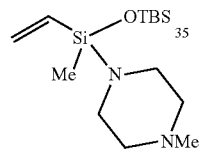 [SMILES: C=C[Si](C)(O[Si](C)(C)C(C)(C)C)N1CCN(C)CC1]

A solution of tert-butyldimethylsilanol (4.68 g, 35.4 mmol, 1.0 equiv.) in ethylacetate (20 ml) was added dropwise to a solution of dichloromethylvinylsilane (5.0 g, 35.4 mmol, 1.0 equiv.) and triethylamine (7.15 g, 70.8 mmol, 2.0 equiv.) in ethyl acetate (70 ml) at room temperature. The mixture was stirred for 2.5 h at room temperature. Then N-methylpiperazine (3.72 g, 37.2 mmol, 1.05 equiv.) was added and the mixture was stirred for a further 20 h. After filtration the solvent was removed under reduced pressure and distillation at 6 mbar furnished modifier S7 (8.57 g, 28.5 mmol, 81%) as a colorless liquid.

$C_{14}H_{32}N_2OSi_2$, $M_w$=300.59 g mol$^{-1}$ bp=113-115° C. (6 mbar). $^1$H NMR (400 MHz, 20° C., $C_6D_6$): δ=6.09 (dd, J=19.7 Hz, J=14.8 Hz, 1H), 5.95 (dd, J=14.8 Hz, J=4.7 Hz, 1H), 5.88 (dd, J=19.7 Hz, J=4.6 Hz, 1H), 3.03-2.95 (m, 4H), 2.20-2.11 (m, 4H), 2.12 (s, 3H), 0.96 (s, 9H), 0.17 (s, 3H), 0.10 (s, 6H) ppm. $^{13}$C NMR (101 MHz, 20° C., $C_6D_6$): δ=137.53 (CH, vinyl), 133.44 ($CH_2$, vinyl), 57.11 (2 CH₂), 46.98 (CH₃), 45.26 (2 CH₂), 25.98 (3 CH₃), 18.42 (C), −2.15 (CH₃), −2.68 (2 CH₃) ppm. GC-MS (EI, 70 eV): m/z (%)=300 (M⁺, 100), 243 (M⁺-C₄H₉, 65), 188 (13), 133 (35), 99 (8), 70 (23). IR (ATR): λ⁻¹=2955 (m), 2928 (m), 2856 (w), 2785 (w), 1472 (w), 1289 (m), 1254 (m), 1151 (m), 1050 (m), 1004 (m), 964 (m), 834 (m), 774 (s), 742 (m), 685 (m) cm⁻¹.

(tert-Butyldimethylsiloxy)(diethylamino)methyl(vinyl)silane (S8)

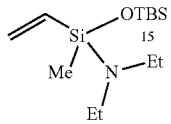

A solution of tertbutyldimethylsilanol (18.7 g, 142 mmol, 1.0 equiv.) in ethyl acetate (80 ml) was added dropwise to a solution of dichloromethylvinylsilane (20.1 g, 142 mmol, 1.0 equiv.) and triethylamine (28.6 g, 248 mmol, 2.0 equiv.) in ethyl acetate (250 ml) at room temperature. The mixture was stirred for 3 h at room temperature. Then diethylamine (10.6 g, 145 mmol, 1.02 equiv.) was added and the mixture was stirred for a further 4 h. After filtration the solvent was removed under reduced pressure and distillation at 4 mbar furnished modifier S8 (27.1 g, 99.1 mmol, 70%) as a colorless liquid.

C₁₃H₃₁NOSi₂, M_w=273.56 g mol⁻¹ bp=78-80° C. (4 mbar). ¹H NMR (400 MHz, 20° C., C₆D₆): δ=6.15 (dd, J=20.0 Hz, J=14.8 Hz, 1H), 5.95 (dd, J=14.8 Hz, J=4.4 Hz, 1H), 5.86 (dd, J=20.0 Hz, J=4.3 Hz, 1H), 2.84 (q, J=7.0 Hz, 4H), 0.99 (t, J=7.0 Hz, 6H), 0.98 (s, 9H), 0.21 (s, 3H), 0.11 (s, 6H) ppm. ¹³C NMR (101 MHz, 20° C., C₆D₆): δ=138.47 (CH, vinyl), 132.72 (CH₂, vinyl), 39.80 (2 CH₂), 25.99 (3 CH₃), 18.45 (C), 16.04 (2 CH₃), −1.54 (CH₃), −2.70 (2 CH₃) ppm. GC-MS (EI, 70 eV): m/z (%)=273 (M⁺, 8), 258 (M⁺-CH₃, 100), 216 (48), 186 (5), 158 (59), 145 (71), 119 (29), 73 (28).

(tert-Butyldimethylsiloxy)(dimethylamino)methyl(vinyl)silane (S9)

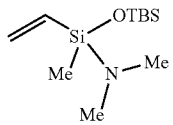

Tertbutyldimethylsilanol (4.69 g, 35.4 mmol, 1.0 equiv.) was added dropwise to a solution of dichloromethylvinylsilane (5.00 g, 35.4 mmol, 1.0 equiv.) and triethylamine (7.53 g, 74.4 mmol, 2.1 equiv.) in ethyl acetate (60 ml) at room temperature. The mixture was stirred for 3 h at this temperature, then dimethylamine (1.76 g, 38.9 mmol, 1.1 equiv.) was added at 0° C. and the mixture was stirred for a further 18 h. After filtration the solvent was removed under reduced pressure and distillation at 24 mbar furnished modifier S9 (6.06 g, 24.7 mmol, 70%) as a colorless liquid.

C₁₁H₂₇NOSi₂, M_w=245.51 g mol⁻¹ bp=89-90° C. (24 mbar). ¹H NMR (400 MHz, 20° C., C₆D₆): δ=6.11 (dd, J=19.8 Hz, J=14.8 Hz, 1H), 5.96 (dd, J=14.8 Hz, J=4.5 Hz, 1H), 5.87 (dd, J=19.8 Hz, J=4.5 Hz, 1H), 2.47 (s 6H), 0.97 (s, 9H), 0.19 (s, 3H), 0.09 (s, 6H) ppm. ¹³C NMR (101 MHz, 20° C., C₆D₆): δ=137.56 (CH, vinyl), 133.27 (CH₂, vinyl), 37.56 (2 CH₃), 25.92 (3 CH₃), 18.42 (C), −2.15 (CH₃), −2.84 (2 CH₃) ppm. GC-MS (EI, 70 eV): m/z (%)=245 (M⁺, 6), 230 (M⁺-CH₃, 10), 188 (99), 145 (100), 105 (7), 73 (20). IR (ATR): λ⁻¹=2955 (m), 2929 (w), 2888 (w), 2857 (m), 2795 (w), 1473 (w), 1254 (m), 1176 (m), 1046 (m), 890 (s), 834 (m), 780 (s), 743 (s), 687 (m) cm⁻¹.

(tert-Butyldimethylsiloxy)(dioctylamino)methyl(vinyl)silane (S10)

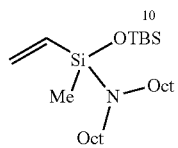

Tertbutyldimethylsilanol (1.41 g, 10.6 mmol, 1.0 equiv) was added dropwise to a solution of dichloromethylvinylsilane (1.50 g, 10.6 mmol, 1.0 equiv.) and trimethylamine (13% solution in THF, 10.6 g, 23.4 mmol, 2.2 equiv.) in EA (10+20 ml) at room temperature. The mixture was stirred for 3 h at room temperature. Then dioctylamine (2.56 g, 10.6 mmol, 1.00 equiv.) was added and the mixture was stirred for further 3 d. Due to a reduction of conversion, triethylamine (1.07 g, 9.0 mmol, 0.85 equiv) was added and the mixture was stirred for a further 1 d at rt. After filtration the solvent was removed under reduced pressure and distillation at 0.4 mbar furnished modifier S10 (2.15 g, 4.87 mmol, 46%) as a colorless liquid.

C₂₅H₅₅NOSi₂, M_w=441.89 g mol⁻¹ bp=185-187° C. (0.44 mbar). ¹H NMR (400 MHz, 20° C., C₆D₆): δ=6.23 (dd, J=20.0 Hz, J=14.8 Hz, 1H), 5.99 (dd, J=14.8 Hz, J=4.4 Hz, 1H), 5.91 (dd, J=20.0 Hz, J=4.4 Hz, 1H), 2.92 (dd, J=8.0 Hz, J=6.8 Hz, 1H), 1.56 (pent, J=7.6 Hz, 4H), 1.33-1.26 (m, 20H), 1.01 (s, 9H), 0.91 (t, J=6.8 Hz, 6H), 0.30 (s, 3H), 0.16 (s, 6H) ppm. ¹³C NMR (101 MHz, 20° C., C₆D₆): δ=138.65 (CH, vinyl), 132.66 (CH₂, vinyl), 46.54 (2 CH₂), 32.54 (2 CH₂), 30.77 (2 CH₂), 30.17 (2 CH₂), 29.90 (2 CH₂), 27.71 (2 CH₂), 26.08 (3 CH₃), 23.15 (2 CH₂), 18.54 (C), 14.40 (2 CH₃), −1.34 (CH₃), −2.59 (CH₃), −2.60 (CH₃) ppm. GC-MS (EI, 70 eV): m/z (%)=441 (M⁺, 3), 426 (M⁺-CH₃, 8), 414 (4), 384 (9), 343 (100), 286 (5), 244 (8), 186 (18), 160 (46), 133 (48), 119 (16). IR (ATR): λ⁻¹=2954 (w), 2926 (m), 2854 (m), 1463 (w), 1253 (m), 1046 (m), 834 (m), 775 (s), 685 (w) cm⁻¹.

tert-Butyldimethylsiloxy)(dihexylamino)methyl(vinyl)silane (S11)

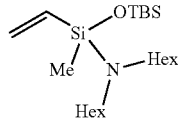

Tertbutyldimethylsilanol (2.34 g, 18.0 mmol, 1.0 equiv.) was added dropwise to a solution of dichloromethylvinylsilane (2.54 g, 18.0 mmol, 1.00 equiv.) and trimethylamine (2.34 g, 39.6 mmol, 2.20 equiv.) in cyclohexane (35 ml) at room temperature. The mixture was stirred for 18 h at room temperature. Then dihexylamine (3.34 g, 18.0 mmol, 1.00 equiv.) was added and the mixture was stirred for further 3 d. After filtration the solvent was removed under reduced pressure and distillation at 4 mbar furnished modifier S11 (6.11 g, 15.8 mmol, 88%) as a colorless liquid.

$C_{21}H_{47}NOSi_2$, $M_w$=385.78 g mol$^{-1}$ bp=155-158° C. (4 mbar). $^1$H NMR (400 MHz, 20° C., $C_6D_6$): δ=6.22 (dd, J=20.4 Hz, J=14.8 Hz, 1H), 5.98 (dd, J=14.8 Hz, J=4.4 Hz, 1H), 5.90 (dd, J=20.0 Hz, J=4.4 Hz, 1H), 2.94-2.87 (m, 4H), 1.53 (pent, J=7.4 Hz, 4H), 1.33-1.12 (m, 12H), 1.00 (s, 9H), 0.90 (t, J=6.8 Hz, 6H), 0.29 (s, 3H), 0.15 (s, 6H) ppm. $^{13}$C NMR (101 MHz, 20° C., $C_6D_6$): δ=138.64 (CH, vinyl), 132.68 ($CH_2$, vinyl), 46.50 (2 $CH_2$), 32.32 (2 $CH_2$), 30.70 (2 $CH_2$), 27.34 (2 $CH_2$), 26.02 (3 $CH_3$), 23.16 (2 $CH_2$), 18.50 (C), 14.32 (2 $CH_3$), −1.37 ($CH_3$), −2.62 (2 $CH_3$) ppm. GC-MS (EI, 70 eV): m/z (%)=385 (M$^+$, 5), 370 (M$^+$-$CH_3$, 16), 315 (100), 274 (1), 244 (15), 215 (1), 202 (8), 186 ($C_{12}H_{28}N'$, 24), 159 (74), 133 (87), 119 (32), 94 (19). IR (ATR): λ$^{-1}$=2956 (m), 2927 (m), 2856 (m), 1462 (w), 1253 (m), 1045 (s), 1003 (m), 834 (s), 770 (s), 745 (m), 687 (m) cm$^{-1}$.

1-[(tert-Butyldimethylsiloxy)methyl(vinyl)silyl]-4-ethylpiperazine (S12)

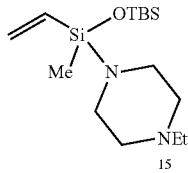

Tertbutyldimethylsilanol (9.38 g, 70.9 mmol, 1.00 equiv.) was added dropwise to a solution of dichloromethylvinyl-silane (10.0 g, 70.9 mmol, 1.00 equiv.) and triethylamine (17.9 g, 177 mmol, 2.50 equiv.) in DCM (160 ml) at room temperature. The mixture was stirred for 3 h at room temperature. Then N-ethylpiperazine (8.10 g, 70.9 mmol, 1.00 equiv.) was added and the mixture was stirred for further 18 h. After filtration the solvent was removed under reduced pressure and distillation at 4 mbar furnished modifier S12 (19.4 g, 61.7 mmol, 87%) as a colorless liquid.

$C_{15}H_{34}N_2OSi_2$, $M_w$=314.62 g mol$^{-1}$ bp=125-130° C. (4 mbar). $^1$H NMR (400 MHz, 20° C., $C_6D_6$): δ=6.11 (dd, J=19.6 Hz, J=14.8 Hz, 1H), 5.97 (dd, J=14.8 Hz, J=4.8 Hz, 1H), 5.90 (dd, J=19.6 Hz, J=4.8 Hz, 1H), 3.06-2.97 (m, 4H), 2.25 (q, J=7.2 Hz, 2H), 2.27-2.18 (m, 4H), 0.99 (t, J=7.2 Hz, 2H), 0.98 (s, 9H), 0.19 (s, 3H), 0.11 (s, 6H) ppm. $^{13}$C NMR (101 MHz, 20° C., $C_6D_6$): δ=137.56 (CH, vinyl), 133.45 ($CH_2$, vinyl), 55.09 (2 $CH_2$), 53.24 ($CH_2$), 45.40 (2 $CH_2$), 25.98 (3 $CH_3$), 18.44 (C), 12.34 ($CH_3$), −2.15 ($CH_3$), −2.67 (2 $CH_3$) ppm. GC-MS (EI, 70 eV): m/z (%)=314 (M$^+$, 100), 299 (M$^+$-$CH_3$, 53), 257 (37), 230 (34), 201 (20), 159 (36), 133 (50), 72 (37). IR (ATR): λ$^{-1}$=2955 (m), 2901 (w), 2804 (w), 1472 (w), 1377 (w), 1253 (m), 1152 (m), 1048 (m), 976 (s), 834 (m), 776 (s), 742 (m), 684 (m), 651 (w) cm$^{-1}$.

4-Benzyl-1-[(tert-Butyldimethylsiloxy)methyl(vinyl)silyl]piperazine (S13)

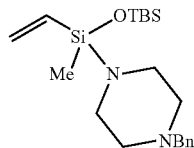 [SMILES: C=C[Si](C)(O[Si](C)(C)C(C)(C)C)N1CCN(Cc2ccccc2)CC1]

Tertbutyldimethylsilanol (6.24 g, 47.1 mmol, 1.00 equiv.) was added dropwise to a solution of dichloromethylvinyl-silane (6.65 g, 47.1 mmol, 1.00 equiv.) and triethylamine (11.9 g, 118 mmol, 2.50 equiv.) in DCM (120 ml) at room temperature. The mixture was stirred for 3 h at room temperature. Then N-benzylpiperazine (8.31 g, 47.1 mmol, 1.00 equiv.) was added and the mixture was stirred for further 18 h. After filtration the solvent was removed under reduced pressure and distillation at 0.5 mbar furnished modifier S13 (12.3 g, 32.7 mmol, 69%) as a colorless liquid.

$C_{20}H_{36}N_2OSi_2$, $M_w$=376.69 g mol$^{-1}$ bp=155-158° C. (0.5 mbar). $^1$H NMR (400 MHz, 20° C., $C_6D_6$): δ=7.35 (d, J=6.8 Hz, 2H), 7.21-7.18 (m, 2H), 7.13-7.09 (m, 1H), 6.08 (dd, J=20.0 Hz, J=14.8 Hz, 1H), 5.95 (dd, J=14.8 Hz, J=4.8 Hz, 1H), 5.87 (dd, J=19.6 Hz, J=4.8 Hz, 1H), 3.34 (s, 2H), 2.98-2.93 (m, 4H), 2.20-2.24 (m, 4H), 0.97 (s, 9H), 0.16 (s, 3H), 0.10 (s, 6H) ppm. $^{13}$C NMR (101 MHz, 20° C., $C_6D_6$): δ=139.24 (C), 137.50 (CH, vinyl), 133.44 ($CH_2$, vinyl), 129.36 (2 CH), 128.48 (2 CH), 127.21 (CH), 64.11 ($CH_2$, benzyl), 55.37 (2 $CH_2$), 45.31 (2 $CH_2$), 25.98 (3 $CH_3$), 18.43 (C), −2.19 ($CH_3$), −2.69 (2 $CH_3$) ppm. GC-MS (EI, 70 eV): m/z (%)=376 (M$^+$, 92), 361 (M$^+$-$CH_3$, 16), 335 (29), 285 (36), 230 (55), 188 (21), 159 (43), 133 (55), 91 ($C_7H_7^+$, 100). IR (ATR): λ$^{-1}$=2954 (m), 2928 (m), 2798 (w), 1471 (w), 1378 (w), 1253 (m), 1132 (m), 1049 (m), 1001 (m), 966 (m), 834 (m), 775 (s), 736 (s), 696 (m) cm$^{-1}$.

(tert-butyldimethylsiloxy)(dibenzylamino)methyl(vinyl)silane (S14)

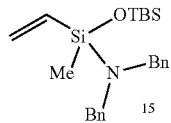

Tertbutyldimethylsilanol (9.38 g, 70.9 mmol, 1.00 equiv.) was added dropwise to a solution of dichloromethylvinyl-silane (10.0 g, 70.9 mmol, 1.00 equiv.) and triethylamine (15.8 g, 156 mmol, 2.20 equiv.) in chexane (180 ml) at room temperature. The mixture was stirred for 3 h at room temperature. Then dibenzylamine (14.0 g, 70.9 mmol, 1.00 equiv.) was added and the mixture was stirred for 2 days. GC-analysis showed only 11% conversion to desired compound therefore a solvent change was performed. After filtration the solvent was removed under reduced pressure and DCM (150 ml) was added. Additional, TMA solution (10% in THF) was added (33 g, 71 mmol, 1.0 equiv.) and the reaction mixture was stirred at rt for 3 days. After filtration all volatile materials were removed under reduced pressure.

Distillation at 0.5 mbar furnished modifier S14 (20.0 g, 50.3 mmol, 71%) as a colorless liquid.

$C_{23}H_{35}NOSi_2$, $M_w$=397.71 g mol$^{-1}$ bp=167-170° C. (0.5 mbar). $^1$H NMR (400 MHz, 20° C., $C_6D_6$): δ=7.26-7.09 (m, 10H), 6.21 (dd, J=20.4 Hz, J=15.2 Hz, 1H), 5.94 (dd, J=15.0 Hz, J=4.0 Hz, 1H), 5.89 (dd, J=20.4 Hz, J=4.0 Hz, 1H), 3.96 (A part of AB-System, J=15.6 Hz, 2H), 3.92 (B part of AB-System, J=15.7 Hz, 2H), 0.98 (s, 9H), 0.32 (s, 3H), 0.11 (s, 6H) ppm. $^{13}$C NMR (101 MHz, 20° C., $C_6D_6$): δ=140.76 (2 C), 137.68 (CH, vinyl), 133.63 (CH$_2$, vinyl), 128.53 (4 CH), 128.39 (4 CH), 126.97 (2 CH), 49.08 (2 CH$_2$), 26.02 (3 CH$_3$), 18.51 (C), -1.56 (CH$_3$), -2.66 (CH$_3$), -2.67 (CH$_3$) ppm. GC-MS (EI, 70 eV): m/z (%)=397 (M$^+$, 5), 382 (M$^+$-CH$_3$, 4), 340 (M$^+$-C$_4$H$_9$, 100), 221 (11), 181 (3), 145 (24), 91 (C$_7$H$_7^+$, 60). IR (ATR): λ$^{-1}$=3030 (w), 2954 (m), 2927 (w), 2855 (w), 1494 (w), 1453 (w), 1365 (w), 1255 (m), 1058 (s), 956 (m), 834 (m), 776 (s), 696 (s), 649 (m) cm$^{-1}$.

Tertbutyldimethylsiloxy)(diallylamino)methyl(vinyl)silane (S15)

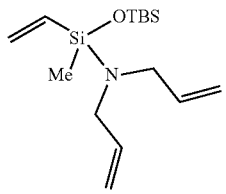 [SMILES: C=CCN(CC=C)[Si](C)(C=C)O[Si](C)(C)C(C)(C)C]

Tertbutyldimethylsilanol (9.38 g, 70.9 mmol, 1.00 equiv.) was added dropwise to a solution of dichloromethylvinylsilane (10.0 g, 70.9 mmol, 1.00 equiv.) and triethylamine (17.9 g, 177 mmol, 2.50 equiv.) in dichloromethane (120 ml) at room temperature. The mixture was stirred for 3 h at room temperature. Then diallylamine (6.89 g, 70.9 mmol, 1.00 equiv.) was added and the mixture was stirred for a further 18 h. After filtration the solvent was removed under reduced pressure and distillation at 4 mbar furnished modifier S15 (17.7 g, 59.5 mmol, 84%) as a colorless liquid.

$C_{15}H_{31}NOSi_2$, $M_w$=297.59 g mol$^{-1}$ bp=96-98° C. (4 mbar). $^1$H NMR (400 MHz, 20° C., $C_6D_6$): δ=6.11 (dd, J=20.0 Hz, J=14.8 Hz, 1H), 5.93 (dd, J=14.8 Hz, J=4.4 Hz, 1H), 5.85 (dd, J=20.0 Hz, J=4.4 Hz, 1H), 5.73 (ddt, J=17.2 Hz, J=10.0 Hz, J=5.6 Hz, 2H), 5.11 (dq, J=17.2 Hz, J=1.7 Hz, 2H), 5.05 (ddt, J=10.0 Hz, J=2.0 Hz, J=1.2 Hz, 2H), 3.45-3.43 (m, 4H), 0.96 (s, 9H), 0.21 (s, 3H), 0.10 (s, 6H) ppm. $^{13}$C NMR (101 MHz, 20° C., $C_6D_6$): δ=138.00 (CH, vinyl), 137.81 (2 CH, allyl), 133.24 (CH$_2$, vinyl), 115.46 (2 CH$_2$, allyl), 48.45 (2 CH$_2$), 25.96 (3 CH$_3$), 18.43 (C), -1.73 (CH$_3$), -2.71 (CH$_3$), -2.72 (CH$_3$) ppm. GC-MS (EI, 70 eV): m/z (%)=297 (M$^+$, 13), 282 (M$^+$-CH$_3$, 37), 270 (49), 240 (100), 198 (32), 159 (47), 145 (64), 133 (65), 119 (40), 103 (15), 73 (39). IR (ATR): λ$^{-1}$=2954 (w), 2855 (w), 1406 (w), 1254 (m), 1046 (m), 1004 (m), 914 (m), 834 (m), 776 (s) cm$^{-1}$.

4-Ethyl-1-(dimethyl(2-methylenebut-3-en-1-yl)silyl) piperazine (S16)

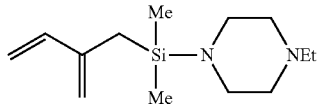

1-((Chloromethyl)dimethylsilyl)-4-ethylpiperazine was prepared using (chloromethyl)dimethylchlorosilane and N-ethylpiperazine. 1-((Chloromethyl)dimethylsilyl)-4-ethylpiperazine was prepared Chloro-prene was prepared according to literature [EP646561] using 3,4-dichlorobut-1-ene and calcium hydroxide.

The following aminosilane functionalized diene was prepared according to a modified procedure from Sakurai [Sakurai et al. *Tetrahedron* 1983, 39, 883-894.]:

Step 1: Under inert conditions, freshly ground Mg turning (1.15 g, 47.5 mmol, 1.10 equiv.) and a catalytic amount of dibromoethane and ZnCl$_2$ (solution in THF) were charged with 50 mL THF into a round bottom flask. The temperature was set to 55° C. and 1-((Chloromethyl)-dimethylsilyl)-4-ethylpiperazine (10.00 g, 45.3 mmol, 1.05 equiv.) was added dropwise to the reaction mixture. The reaction mixture was then stirred for 15 min under reflux and afterwards for 3 h at 50° C. After this time, the reaction mixture was filtered under inert gas conditions and used as a solution in step 2.

Step 2: Under inert gas conditions, freshly distilled chloroprene (3.82 g, 43.1 mmol, 1.00 equiv) was dissolved in 50 mL THF and 1,3-bis(diphenylphosphino)propane nickel (II) chloride (1.2 g, 2.2 mmol, 0.05 equiv.) was added at rt. 1 h stirring at rt Then the solution prepared in step 1 was added dropwise and the reaction was stirred at rt overnight. The solvent was removed, the residue was then dissolved in cyclohexane and the salts were filtered off. The solvent of the remaining solution was again removed. S16 was isolated by distillation in vacuo (4.42 g, 43%) as a colorless oil.

$C_{13}H_{26}N_2Si$, Mw=238.45 g mol$^{-1}$ bp=69° C. (0.001 mbar). $^1$H NMR (400 MHz, 20° C., $C_6D_6$): δ=6.39 (dd, J=17.3 Hz, J=10.8 Hz, 1H), 5.15 (d, J=17.3 Hz, 1H), 5.00 (d, J=10.8 Hz, J=4.8 Hz, 1H), 4.96-4.93 (m, 1H), 4.89-4.86 (m, 1H), 2.86 (t, J=4.9 Hz, 4H), 2.25 (q, J=7.3 Hz, 2H), 2.24-2.13 (m, 4H), 1.73 (s, 2H), 1.01 (t, J=7.3 Hz, 3H), 0.08 (s, 6H) ppm. $^{13}$C NMR (101 MHz, 20° C., $C_6D_6$): δ=144.44 (C, butadienyl), 140.49 (CH, butadienyl), 114.90 (CH$_2$, butadienyl), 113.68 (CH$_2$, butadienyl), 55.20 (2 CH$_2$), 53.26 (CH$_2$), 45.86 (2 CH$_2$), 21.47 (CH$_2$), 12.34 (CH$_3$), 2.17 (2 CH$_3$), 2.67 (2 CH$_3$) ppm. GC-MS (EI, 70 eV): m/z (%)=238 (M$^+$, 100), 171 (63), 142 (28), 114 (33). 84 (51), 59 (43). IR (ATR): λ$^{-1}$=3084 (m), 2953 (w), 2815 (w), 1587 (s), 1447 (w), 1377 (m), 1307 (m), 1247 (s), 1151 (m), 1102 (m), 1032 (m), 990 974 (m), 899 (m), 874 (m), 830 (s), 656 (s) cm$^{-1}$.

*) compounds S1 and S2 are outside the scope of Formula 2 and have been found not to be effective in improving storage stability.

2) Polymerization Procedures

General Polymerization Procedure: Examples Ex1-Ex4,

Cyclohexane (amount given in tables 1-5), butadiene (98.3% of amount given in tables 1-6) and styrene (amount given in table) were charged to an airfree 10 l (or 5 l) reactor and the stirred mixture was heated up to 40° C. Then TMEDA (amount is given in table) and branching agent (BA) (amount and modifier is given in tables 1-5) was added and n-butyllithium was charged dropwise to react the impurities until the color of the reaction mixture changed to yellowish (titration). After that the recipe amount of initiator in cyclohexane corresponding to the target molecular weight of the polymer was charged immediately to start the polymerization. The start time of the charge of the initiator was used as the start time of the polymerization. Simultaneously, the temperature was increased by heating or cooling in the wall of the reactors beginning with the charge of the initiator to the final polymerization temperature of 60° C. for 80 min. Then butadiene (1.7% of amount given in table) was charged. After 5 min chainend modifier 3-methoxy-3,8,8,9,9-pentamethyl-2-oxa-7-thia-3,8-disiladecane (2f) (amount given in table 1) was added. The reaction was terminated after 20 min with charge of methanol. The polymer solution was stabilized with Irganox 1520D, the polymer recovered by steam stripping and dried until a content of residual volatiles <0.6% was obtained. The complete data set of the sample is given in table 1.

Polymerization Procedure: Examples A-E

Cyclohexane (amount given in table 2), butadiene (A-D, 100% of amount given in table 1; E, 98% of total amount) was charged to an airfree 10 l reactor and the stirred mixture was heated up to 40° C. Then TMEDA (amount given in table 2), and branching agents M (amount given in table 2) and optional stabilizer S (amount given in table 2) were added and n-butyllithium was charged dropwise to react the impurities until the color of the reaction mixture changed to yellowish (titration). After that the recipe amount of NB in cyclohexane corresponding to the target molecular weight of the polymer was charged immediately to start the polymerization. The start time of the charge of the initiator was used as the start time of the polymerization. Simultaneously, the temperature was increased by heating or cooling in the wall of the reactors beginning with the charge of the initiator to the final polymerization temperature of 60° C. for 30 min. The reaction mixture was further stirred at 60° C. for about 60 min. For E butadiene was added (2% of amount given in table 2) and the mixture was stirred for a further 5 min. Then endmodifier was added and the mixture was stirred for further 20 min. Then the reaction was terminated with charge of methanol. The polymer solution was stabilized with Irganox 1520D. The complete data set of the sample is given in table 2.

Polymerization Procedure: Examples F-I

Cyclohexane (amount given in table 3), butadiene (98% of total amount) was charged to an airfree 10 l reactor and the stirred mixture was heated up to 40° C. Then TMEDA (amount given in table 3), and branching agents M (amount given in table 3) and optional stabilizer S (amount given in table 3) were added and n-butyllithium was charged dropwise to react the impurities until the color of the reaction mixture changed to yellowish (titration). After that the recipe amount of NB in cyclohexane corresponding to the target molecular weight of the polymer was charged immediately to start the polymerization. The start time of the charge of the initiator was used as the start time of the polymerization. Simultaneously, the temperature was increased by heating or cooling in the wall of the reactors beginning with the charge of the initiator to the final polymerization temperature of 60° C. for 30 min. The reaction mixture was further stirred at 60° C. for about 60 min. Butadiene was added (2% of amount given in table 3) and the mixture was stirred for a further 5 min. Then endmodifier was added and the mixture was stirred for further 20 min. Then the reaction was terminated with charge of methanol. The polymer solution was stabilized with Irganox 1520D. The complete data set of the sample is given in table 3.

Polymerization Procedure: Examples J-L

Cyclohexane (amount given in table 4), butadiene (100% of total amount) was charged to an airfree 10 l reactor and the stirred mixture was heated up to 40° C. Then TMEDA (amount given in table 4), and branching agents M (amount given in table 4) and optional stabilizer S (amount given in table 4) were added and n-butyllithium was charged dropwise to react the impurities until the color of the reaction mixture changed to yellowish (titration). After that the recipe amount of NB in cyclohexane corresponding to the target molecular weight of the polymer was charged immediately to start the polymerization. The start time of the charge of the initiator was used as the start time of the polymerization. Simultaneously, the temperature was increased by heating or cooling in the wall of the reactors beginning with the charge of the initiator to the final polymerization temperature of 60° C. for 15 min. The reaction mixture was further stirred at 60° C. for about 60 min. Then endmodifier was added and the mixture was stirred for further 20 min. Then the reaction was terminated with charge of methanol. The polymer solution was stabilized with Irganox 1520D. The complete data set of the sample is given in table 4.

TABLE 1

Polymerisation 1.

|  | Ex1 | Ex2 | Ex3 | Ex4 |
|---|---|---|---|---|
| Cyclohexane/g | 4803 | 4798 | 4997 | 4816 |
| Butadiene/g | 658 | 660 | 521 | 665 |
| Styrene/g | 175 | 176 | 141 | 175 |
| TMEDA/mmol | 8.92 | 8.24 | 6.61 | 7.63 |
| Initiator/mmol | NB 4.46 | NB 4.57 | NB 3.38 | NB 5.12 |
| BA1/mmol | M2 1.56 | M3 2.90 | M1 1.79 | M2 1.66 |
| BA2/mmol | — | — | M3 1.32 | — |
| Stabilizer/mmol | — | — | — | S6 3.95 |
| Cpd 2f/mmol | 5.35 | 4.22 | 4.25 | 4.71 |
| Mp/kg/mol | 335 | 256 | 346 | 387 |
| Coupl. rate/% | 48.8 | 39.8 | 51.7 | 40.9 |
| Vinyl content/% | 63.0 | 64.3 | 62.1 | 61.7 |
| Styrene content | 21.1 | 19.7 | 21.1 | 20.9 |
| $M_L/MU_{(direct\ after\ coagulation)}$ | 98.4 | 57.2 | 137.2 | 108.1 |

Examples Ex1-Ex3 are unstabilized comparative examples. Ex4 is stabilized with stabilizer S6.

TABLE 2

| Polymerisation 2. | | | | | |
|---|---|---|---|---|---|
| | A | B* | C | D | E |
| Cyclohexane/g | 5116 | 5116 | 5116 | 5113 | 5116 |
| Butadiene/g | 721 | 722 | 721 | 722 | 725 |
| Styrene/g | 170 | 170 | 170 | 170 | 170 |
| TMEDA/mmol | 8.85 | 8.81 | 8.80 | 8.84 | 8.82 |
| Initiator/mmol | NB 4.14 | NB 4.14 | NB 4.15 | NB 4.15 | NB 4.39 |
| BA1/mmol | M3 2.68 | M3 2.66 | M3 2.66 | M3 2.69 | M3 2.67 |
| Stabilizer/mmol | S3 4.09 | S2 4.07 | S7 4.07 | — | — |
| Endmod1/mmol | — | — | — | — | Bu-2f 4.46 |
| Mp/kg/mol | 316 | 312 | 325 | 325 | 304 |
| Coupl. rate/% | 34.8 | 36.8 | 37.4 | 36.2 | 36.0 |
| Vinyl content/% | 65.5 | 65.1 | 65.5 | 66.8 | 66.0 |
| Styrene content/% | 19.6 | 19.7 | 19.6 | 19.7 | 19.3 |
| $M_L/MU_{(direct\ after\ coagulation)}$ | 81.0 | 78.8 | 83.2 | 84.3 | 83.2 |

Polymer A shows moderate stabilization vs. polymer B with nonstabilizing modifier S2. Polymer D is an unstabilized comparative example. Polymer E is an unstabilized chain end-functionalized comparative example.

TABLE 3

| Polymerisation 3. | | | | |
|---|---|---|---|---|
| | F | G | H | I |
| Cyclohexane/g | 5388 | 5105 | 5139 | 5097 |
| Butadiene/g | 434 | 753 | 625 | 723 |
| Styrene/g | 290 | 133 | 268 | 169 |
| TMEDA/mmol | 5.36 | 10.0 | 14.1 | 8.80 |
| Initiator/mmol | NB 2.64 | NB 5.04 | NB 7.05 | NB 4.39 |
| BA1/mmol | M3 0.42 | M2 0.51 | M2 0.723 | M3 2.68 |
| Stabilizer/mmol | S14 0.68 | S6 1.01 | S6 1.44 | — |
| Endmod/mmol | Bu-2f 2.71 | Si1 5.06 | Si1 7.17 | Si1 4.49 |
| Mp/kg/mol | 432 | 285 | 213 | 332 |
| Coupl. rate/% | 23.6 | 12.9 | 16.7 | 32.6 |
| Vinyl content/% | 52.3 | 65.9 | 60.4 | 64.6 |
| Styrene content/% | 37.8 | 15.6 | 29.0 | 18.9 |
| $M_L/MU_{(direct\ after\ coagulation)}$ | 121.8 | 38.4 | 25.2 | 78.7 |

TABLE 4

| Polymerisation 4. | | | |
|---|---|---|---|
| | J | K | L |
| Cyclohexane/g | 4746 | 4742 | 4712 |
| Butadiene/g | 677 | 673 | 706 |
| Styrene/g | 159 | 159 | 125 |
| TMEDA/mmol | 8.37 | 8.38 | 10.50 |
| Initiator/mmol | NB 4.33 | NB 4.33 | NB 5.44 |
| BA1/mmol | M3 2.57 | M3 2.59 | M1 0.98 |
| Stabilizer/mmol | S16 8.24 | S16 20.44 | S16 9.58 |
| Endmod/mmol | — | — | Si4 5.43 |
| Mp/kg/mol | 324 | 310 | 257 |
| Coupl. rate/% | 33.7 | 34.0 | 18.2 |
| Vinyl content/% | 65.1 | 64.5 | 69.5 |
| Styrene content/% | 18.5 | 18.8 | 15.6 |
| $M_L/MU_{(direct\ after\ coagulation)}$ | 76.2 | 76.5 | 34.9 |

NB = nBuLi, 2f = 3-Methoxy-3,8,8,9,9-pentamethyl-2-oxa-7-thia-3,8-disiladecane, Bu-2f = [3-(Butylthio)propyl]dimethoxy(methyl)silane, Si1 = Dimethoxydimethylsilane, Si4 = 3-Chloropropyldimethoxymethylsilane.

Storage Stability of Coagulated Rubber:
Drying cabinet for 70° C. storage: "Memmert Modell 800" at 70° C. with recirculating air.
Analytical Instruments:
The molecular weight analyses were carried out by SEC/RI using a HEWLETT PACKARD HP 1100. The eluent THF was degassed on line. The solvent flow rate was 1.0 ml/min. 100 μL of polymer solution were injected per analysis. The analyses were carried out at 40° C. The molecular weights were initially calculated based on a polystyrene calibration and given in the tables as polystyrene. The real molecular weights (SSBR molecular weights) can be determined dividing by a factor derived from an earlier comparison between molecular weights from SEC/RI and SEC/MALLS. The value of the factor depends on the polymer composition (styrene and butadiene content) and to some extent to the molecular weight. A factor of 1.52 can be used for SSBR with 21% and 30% styrene. A factor of 1.84 can be used for SBR with 0% styrene. A factor of 1.56 can be used for SSBR with 16% styrene. A factor of 1.41 can be used for SSBR with 45% styrene. NMR-spectroscopy was performed on a BRUKER Avance 400 in a 5 mm BBO probe. Solvents, frequencies and temperature are given in the characterization data.

FTIR-spectroscopy measured in attenuated total reflection was used to determine the vinyl content and styrene content.

The glass transition temperature was determined using the DSC Q2000 under the following conditions:
Weight: ca. 10-12 mg
Sample container: Alu/S
Temperature range: (−140 . . . 80) ° C.
Heating rate: 20 K/min respectively 5 K/min
Cooling rate: free cooling
Purge gas: 20 ml Ar/min
Cooling agent: liquid nitrogen
Each sample was measured at least once. The measurements contain two heating runs. The 2nd heating run was used to determine the glass transition temperature.

Measurements of non-vulcanized rheological properties according to ASTM D 5289-95 were made using a rotor-less shear rheometer (MDR 2000 E) to characterize cure characteristics.

What is claimed is:

1. A process for preparing a branched elastomeric polymer, said process comprising:
(a) polymerizing at least one conjugated diene and a compound of Formula 1 as defined below, and optionally one or more aromatic vinyl monomers, in the presence of an initiator compound,
(a') polymerizing at least one conjugated diene and optionally one or more aromatic vinyl monomers in the presence of an initiator compound obtained by reacting a compound of Formula 1 as defined below with an organo-alkali metal compound, or
(a'') reacting a living polymer, obtained by anionically polymerizing at least one conjugated diene and optionally one or more aromatic vinyl monomers, with a compound of Formula 1 as defined below, (A)–B$_n$  (Formula 1)

wherein
A is an organic group having at least two amino groups;
each B is independently selected from a group —Si(R$^1$)(R$^2$)(R$^3$), wherein R$^1$, R$^2$ and R$^3$ are each independently selected from vinyl, butadienyl, methyl, ethyl, propyl, butyl, hexyl, octyl, phenyl and benzyl, with the proviso that only one of R$^1$, R$^2$ and R$^3$ is vinyl or butadienyl, wherein each group B is a substituent of an amino group of group A;
at least two of the amino groups of group A are each substituted with at least one group B;
n is an integer of at least 2; and
all amino groups in group A are tertiary amino groups;
wherein (a), (a') and (a'') is carried out in the presence of a stabilizer compound of Formula 2 as defined below:

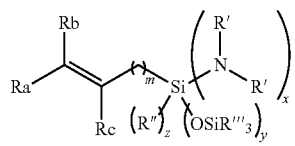

(Formula 2)

wherein
R' is independently selected from C$_1$-C$_{12}$ alkyl, C$_2$-C$_{12}$ alkenyl, C$_6$-C$_{18}$ aryl and C$_7$-C$_{18}$ alkylaryl, wherein the two R' groups may be connected to form a ring and the ring may contain, further to the Si-bonded nitrogen atom, one or more of an oxygen atom, a nitrogen atom, an >N(C$_1$-C$_6$ alkyl, C$_6$-C$_{18}$ aryl, C$_7$-C$_{18}$ alkylaryl) group and a sulfur atom;
R'' is selected from C$_1$-C$_6$ hydrocarbyl;
R''' is independently selected from C$_1$-C$_{18}$ hydrocarbyl;
R$_a$, R$_b$ and R$_c$ are independently selected from hydrogen, methyl, ethyl and vinyl, with the proviso that at most one of R$_a$, R$_b$, and R$_c$ is vinyl;
x is an integer selected from 1 and 2; y is an integer selected from 0, 1 and 2; z is an integer selected from 0, 1 and 2; and x+y+z=3;
m is selected from 0 and 1; with the proviso that, when none of R$_a$, R$_b$ and R$_c$ is vinyl, then m=0.

2. The process according to claim 1, wherein the compound of Formula 1 is a compound selected from the following Formulas 1-1 to 1-5:

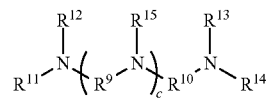

(Formula 1-1)

wherein
each of R$^{11}$, R$^{12}$, R$^{13}$, R$^{14}$ and R$^{15}$ is independently selected from group B, C$_1$-C$_{18}$ alkyl, C$_6$-C$_{18}$ aryl, optionally C$_1$-C$_4$ alkyl-substituted C$_3$-C$_{12}$ heteroaryl, C$_7$-C$_{18}$ aralkyl, (R$^4$)$_a$—O—(R$^5$)$_b$, wherein each of R$^4$ and R$^5$ is independently selected from C$_1$-C$_6$ alkyl and C$_6$-C$_{18}$ aryl and a and b are each integers independently selected from 0 to 4, and —Si(R$^6$)(R$^7$)(R$^8$), wherein each of R$^6$, R$^7$ and R$^8$ is independently selected from methyl, ethyl, propyl, butyl, hexyl, octyl, phenyl and benzyl;
each of R$^9$ and R$^{10}$ is independently selected from divalent ethyl, propyl, butyl, phenyl and —(CH$_2$)$_{a'}$—C$_6$H$_5$—(CH$_2$)$_{b'}$—, wherein each of a' and b' is an integer independently selected from 0 and 1; and
c is an integer selected from 0, 1, 2 and 3;

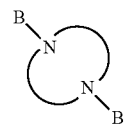

(Formula 1-2)

wherein the group —N< >N— is a 5- to 18-membered heterocyclic group which may be saturated or unsaturated and which may be substituted on any carbon atom of the ring with a C$_1$-C$_6$ alkyl group, wherein heteroatomic groups other than the two N atoms expressly shown in Formula 1-2 are selected from —N=, >NR$^{16}$, wherein R$^{16}$ is selected from group B, C$_1$-C$_6$ alkyl, phenyl and benzyl, —O—, —S— and >SiR$^{17}$R$^{18}$, wherein each of R$^{17}$ and R$^{18}$ is independently selected from C$_1$-C$_6$ alkyl, phenyl and benzyl;

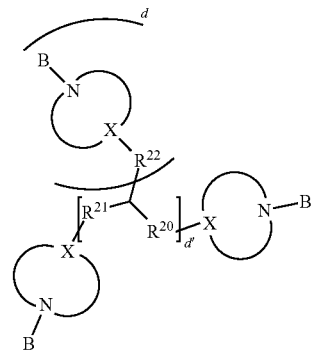

(Formula 1-3)

wherein each of R$^{20}$, R$^{21}$ and R$^{22}$ is independently selected from a single bond and a divalent C$_1$-C$_{10}$ alkyl group, d is an integer selected from 0, 1 and 2, d' is an integer selected from 0 and 1, wherein d is 0 when d' is 0, each group —N< >X— is independently selected from a 5- to 10-membered heterocyclic group which may be saturated or unsaturated and which may be substituted on any carbon atom of the ring with a C$_1$-C$_6$ alkyl group, wherein each X is independently selected from —N—, —C═ and —CH—, and heteroatomic groups other than the two groups N and X expressly shown in Formula 1-3 are selected from —N═, >NR$^{16}$, wherein R$^{16}$ is selected from C$_1$-C$_6$ alkyl, group B, phenyl and benzyl, —O—, —S— and >SiR$^{17}$R$^{18}$, wherein each of R$^{17}$ and R$^{18}$ is independently selected from C$_1$-C$_6$ alkyl, phenyl and benzyl;

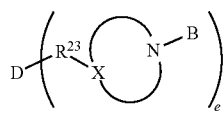
(Formula 1-4)

wherein D is a 5- to 10-membered carbocyclic or heterocyclic group which may be saturated or unsaturated and which may be substituted on any carbon atom of the ring with a C$_1$-C$_6$ alkyl group, wherein heteroatomic groups are selected from —N═, >NR$^{16}$, wherein R$^{16}$ is selected from C$_1$-C$_6$ alkyl, group B, phenyl and benzyl, —O—, —S— and >SiR$^{17}$R$^{18}$, wherein each of R$^{17}$ and R$^{18}$ is independently selected from C$_1$-C$_6$ alkyl and phenyl, each group —N<>X— is independently selected from a 5- to 10-membered heterocyclic group which may be saturated or unsaturated and which may be substituted on any carbon atom of the ring with a C$_1$-C$_6$ alkyl group, wherein each X is independently selected from —N—, —C═ and —CH—, R$^{23}$ is selected from a single bond and a divalent C$_1$-C$_{10}$ alkyl group, and e is an integer selected from 2, 3 and 4;

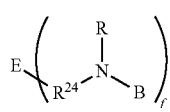
(Formula 1-5)

wherein E is a 6- to 10-membered cycloaliphatic or aromatic group, each R$^{24}$ is independently selected from a single bond and C$_1$-C$_2$ alkyl, each R is independently selected from B, C$_1$-C$_6$ alkyl and benzyl, and f is an integer selected from 2 and 3.

3. The process according to claim 1, wherein the compound of Formula 1 is selected from

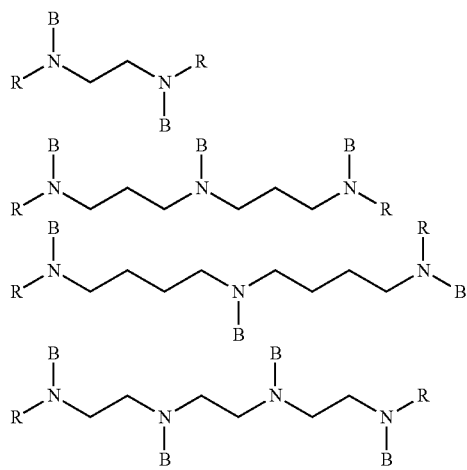

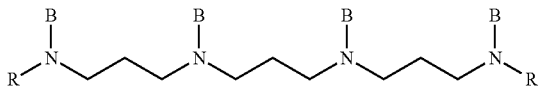

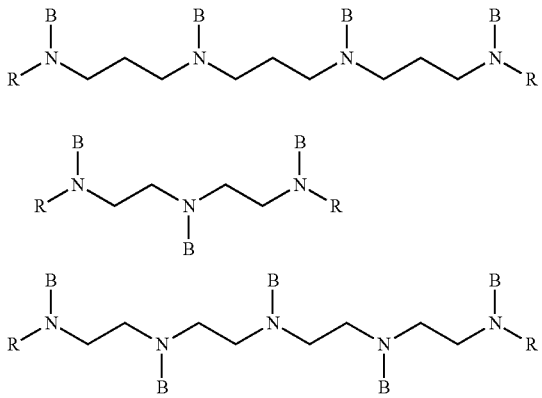

wherein each R is independently selected from B, C$_1$-C$_6$ alkyl and benzyl;

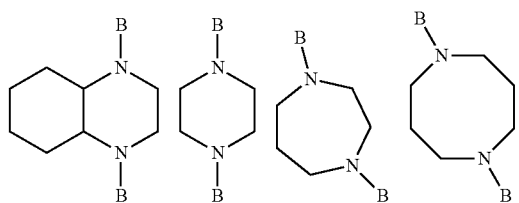

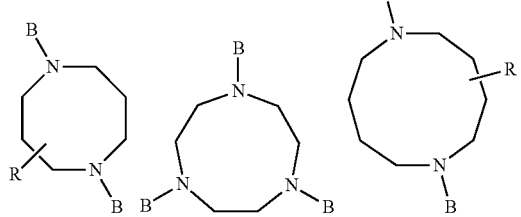

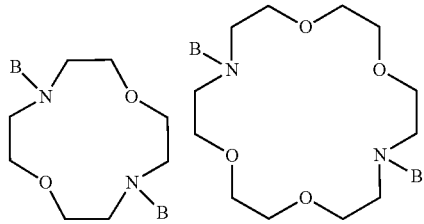

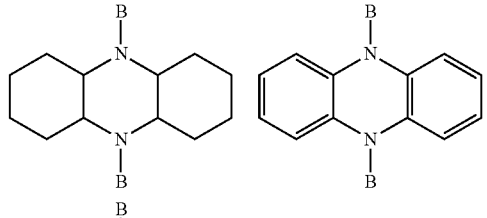

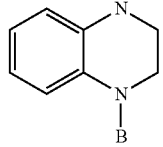

wherein R is a C$_1$-C$_6$ alkyl group; and

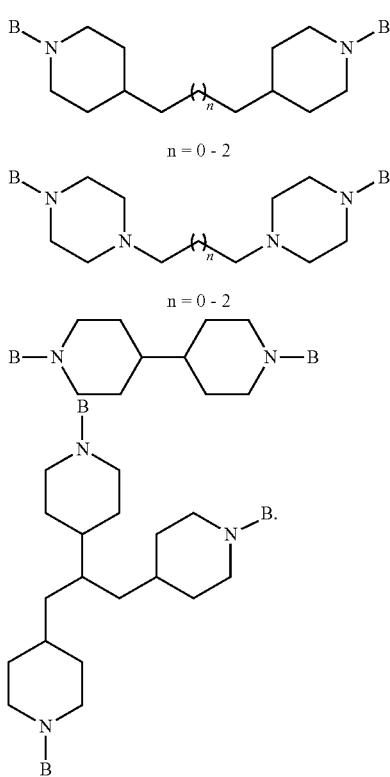

4. The process according to claim 1, wherein R''' in Formula 2 is independently selected from $C_1$-$C_{18}$ alkyl, $C_2$-$C_{18}$ alkenyl, $C_6$-$C_{18}$ aryl and $C_7$-$C_{18}$ alkylaryl.

5. The process according to claim 1, wherein R' in Formula 2 is independently selected from methyl, ethyl, n-propyl, n-butyl, isobutyl, pentyl, hexyl, octyl and benzyl, or the two R' groups are connected to form, together with the Si-bonded nitrogen atom, a 5- to 12-membered ring.

6. The process according to claim 1, wherein R'' in Formula 2 is selected from $C_1$-$C_6$ alkyl and phenyl.

7. The process according to claim 1, wherein $R_a$, $R_b$ and $R_c$ in Formula 2 are identical.

8. The process according to claim 1, wherein in Formula 2
(i) x, y and z are each 1 and m=0,
(ii) x=2, y=0, z=1 and m=0, or
(iii) x=1, y=0, z=2 and m=1 and
at most one of $R_a$, $R_b$ and $R_c$ is vinyl.

9. The process according to claim 1, wherein the initiator compound in step (a) or the organo-alkali metal compound in step (a') is selected from methyllithium, ethyllithium, n-butyllithium, s-butyllithium, tert-butyllithium, tert-octyllithium, isopropyllithium, phenyllithium, cyclohexyllithium, 2-butyllithium, 4-phenylbutyllithium, t-butyldimethylsilyloxypropyllithium, dialkylaminopropyllithium, N-morpholinopropyllithium, sodium biphenylide, sodium naphthalenide, potassium naphthalenide, 1,3-bis(1-(phenyl)1-lithiohexyl)benzene, 1,3-bis(1-(4-ethylphenyl)1 dithiohexyl)benzene, 1,3-bis(1-(4-methyl-phenyl)1 dithiohexyl)benzene, 1,3-bis(1-(4-propylphenyl)1-lithiohexyl)benzene, 1,3-bis(1-(4-(tert-butyl)phenyl)1 dithiohexyl)-benzene, 1,3-bis(1-(4-(diethylamino)phenyl)1 dithiohexyl)-benzene, 1,3-bis(1-(4-(dimethylamino)phenyl)1-lithiohexyl)benzene, 1,3-bis(1-(4-ethoxy-phenyl)1-lithiohexyl)benzene, 1,3-bis (1-(4-(dimethoxy)phenyl)1 dithiohexyl)benzene, (((dimethylamino)dimethylsilyl)methyl)lithium, (((diethylamino)dimethylsilyl)methyl)lithium, (((dibutylamino)dimethylsilyl)methyl)lithium, (((dihexylamino)dimethylsilyl)methyl)lithium, (((dioctylamino)dimethylsilyl)methyl)lithium, (((dibenzylamino)dimethylsilyl)methyl)lithium, ((dimethyl(piperidin-1-yl)silyl)methyl)lithium, ((dimethyl(morpholino)silyl)methyl)lithium, ((dimethyl(4-methylpiperazin-1-yl)silyl)methyl)lithium, ((dimethyl(4-ethylpiperazin-1-yl)silyl)methyl)lithium, and ((dimethyl(4-benzylpiperazin-1-yl)silyl)methyl)lithium.

10. The process according to claim 1, wherein the stabilizer of Formula 2 is used in an amount of 0.01 to 100 equivalent per equivalent of initiator or living polymer chain end.

11. A branched elastomeric polymer obtained by a process as defined in claim 1.

12. A non-vulcanized polymer composition comprising the branched elastomeric polymer as defined in claim 11 and one or more further components selected from (i) components which are added to or formed as a result of the polymerization process used for making said polymer, (ii) components which remain after solvent removal from the polymerization process, and (iii) components which are added to the polymer after completion of the polymer manufacturing process, wherein said composition optionally comprises one or more fillers.

13. The non-vulcanized polymer composition according to claim 12, which further comprises one or more extender oils.

14. The non-vulcanized polymer composition according to claim 12, which further comprises one or more vulcanizing agents.

15. A vulcanized polymer composition which is obtained by vulcanizing the non-vulcanized polymer composition as defined in claim 14.

16. A process for preparing a vulcanized polymer composition, said process comprising vulcanizing the non-vulcanized polymer composition as defined in claim 14.

17. An article comprising at least one component formed from the vulcanized polymer composition as defined in claim 15, which article is selected from a tire, a tire tread, a tire side wall, a tire carcass, a belt, a gasket, a seal, a hose, a vibration damper, a footwear component, a golf ball and a hose.

18. The process according to claim 5 wherein the 5- to 12-membered ring is a morpholine group, an oxazolidine group, a thiazolidine group, a thiamorpholine group, a 4-methylpiperazine group, a 4-ethylpiperazine group, a 4-propylpiperazine group, a 4-butylpiperazine group or a 4-benzylpiperazine group.

* * * * *